US012406276B2

(12) United States Patent
Aurongzeb et al.

(10) Patent No.: US 12,406,276 B2
(45) Date of Patent: Sep. 2, 2025

(54) SYSTEM AND METHOD FOR RECOMMENDING AND REWARDING CONFIGURATION ADJUSTMENTS FOR EXTENDING INFORMATION HANDLING SYSTEM HARDWARE LIFE

(71) Applicant: Dell Products, LP, Round Rock, TX (US)

(72) Inventors: Deeder M. Aurongzeb, Austin, TX (US); Malathi Ramakrishnan, Madurai (IN); Parminder Singh Sethi, Punjab (IN)

(73) Assignee: DELL PRODUCTS LP, Round Rock, TX (US)

( * ) Notice: Subject to any disclaimer, the term of this patent is extended or adjusted under 35 U.S.C. 154(b) by 0 days.

(21) Appl. No.: 17/871,552

(22) Filed: Jul. 22, 2022

(65) Prior Publication Data

US 2024/0029096 A1 Jan. 25, 2024

(51) Int. Cl.
*G06Q 30/0207* (2023.01)
*G06F 9/50* (2006.01)

(52) U.S. Cl.
CPC ....... *G06Q 30/0207* (2013.01); *G06F 9/5027* (2013.01)

(58) Field of Classification Search
CPC ............ G06Q 30/0207; G06Q 30/0239; G06F 9/5027

(Continued)

(56) References Cited

U.S. PATENT DOCUMENTS 7,885,858 B2 * 2/2011 Mehta ................ G06Q 30/0633
705/26.1
8,595,234 B2 11/2013 Siripurapu
(Continued)

FOREIGN PATENT DOCUMENTS

WO 2011/106160 A2 9/2011

OTHER PUBLICATIONS

Platini, Marc., et al. "CPU Overheating Characterization in HPC Systems: A Case Study." 2018 IEEE/ACM 8th Workshop on Fault Tolerance for HPC in extreme Scale. (Year: 2018).*
(Continued)

*Primary Examiner* — Tarek Elchanti
(74) *Attorney, Agent, or Firm* — Prol Intellectual Property Law, PLLC; H. Kenneth Prol

(57) ABSTRACT

A hardware life extension learning recommendation and reward system of an information handling system may comprise a network interface device to receive operational telemetries from a first and a second computing device that each include a high temperature warning, an error for a labeled hardware type, and execution of a specific application, and a processor to determine, based on these telemetries, that failure of a first component of the labeled hardware type previously occurred at the first device, failure of a second component of the labeled hardware type has occurred at the second device, and execution at the first device of a previous recommendation to limit access to resources of the first component made available to the specific application extended the first component lifetime. A new recommendation may be transmitted to the second device to limit access to resources of the second component to the specific application.

20 Claims, 5 Drawing Sheets

(58) Field of Classification Search
USPC .................................. 705/14.1, 14.15, 26.1
See application file for complete search history.

(56) References Cited

U.S. PATENT DOCUMENTS

| | | | |
|---|---|---|---|
| 8,626,450 B2 | 1/2014 | Dooley | |
| 8,930,236 B2 * | 1/2015 | Gillenson | G06Q 30/0211 |
| | | | 705/14.15 |
| 9,760,474 B2 | 9/2017 | Pillai | |
| 10,581,974 B2 * | 3/2020 | Sustaeta | G05B 13/0265 |
| 10,705,786 B2 | 7/2020 | Liu | |
| 10,902,448 B2 | 1/2021 | Munjal | |
| 10,977,293 B2 | 4/2021 | Cai | |
| 2009/0292617 A1 | 11/2009 | Sperling | |
| 2010/0070404 A1 | 3/2010 | McConnell | |
| 2012/0158477 A1 | 6/2012 | Tennenholtz | |
| 2013/0246147 A1 | 9/2013 | Chen | |
| 2014/0100937 A1 | 4/2014 | Na | |
| 2014/0316964 A1 | 10/2014 | Slutsker | |
| 2017/0123857 A1 | 5/2017 | Khan | |
| 2017/0357224 A1 * | 12/2017 | Berrien | F24F 11/62 |
| 2017/0363479 A1 * | 12/2017 | Harvey | G01K 11/12 |
| 2019/0349321 A1 | 11/2019 | Cai | |
| 2021/0004328 A1 | 1/2021 | Wang | |
| 2022/0019483 A1 * | 1/2022 | duPont | G06F 9/5083 |
| 2022/0019484 A1 * | 1/2022 | duPont | G06F 9/5083 |

OTHER PUBLICATIONS

Nick Barney, Telemetry, 2022 (Year: 2022).*
C. Herrmann, et al., "Sustainability as Strategic Business Model for Profitable Business," 6 pages, May 2014.
A. Stenhall, "What is the carbon footprint of a typical corporate laptop?," 4 pages, Oct. 2020 https://climatesmartit.com/2020/10/25/what-is-the-carbon-footprint-of-a-typical-corporate-laptop/.
K. Abnett, et al., "EU proposes world's first carbon border tax for some imports," 8 pages, Jul. 2021 https://www.reuters.com/business/sustainable-business/eu-proposes-worlds-first-carbon-border-tax-some-imports-2021-07-14/.

* cited by examiner

SYSTEM AND METHOD FOR RECOMMENDING AND REWARDING CONFIGURATION ADJUSTMENTS FOR EXTENDING INFORMATION HANDLING SYSTEM HARDWARE LIFE

FIELD OF THE DISCLOSURE

The present disclosure generally relates to determining adjustments to be made to an information handling system hardware configuration or software configuration to extend the lifetime of a specific hardware component. More specifically, the present disclosure relates to a machine learning system for generating recommendations for such adjustments based on previously user-approved and executed recommendations at other information handling systems and measured extensions of similar or identical hardware components.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, video communication capabilities, and audio capabilities.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
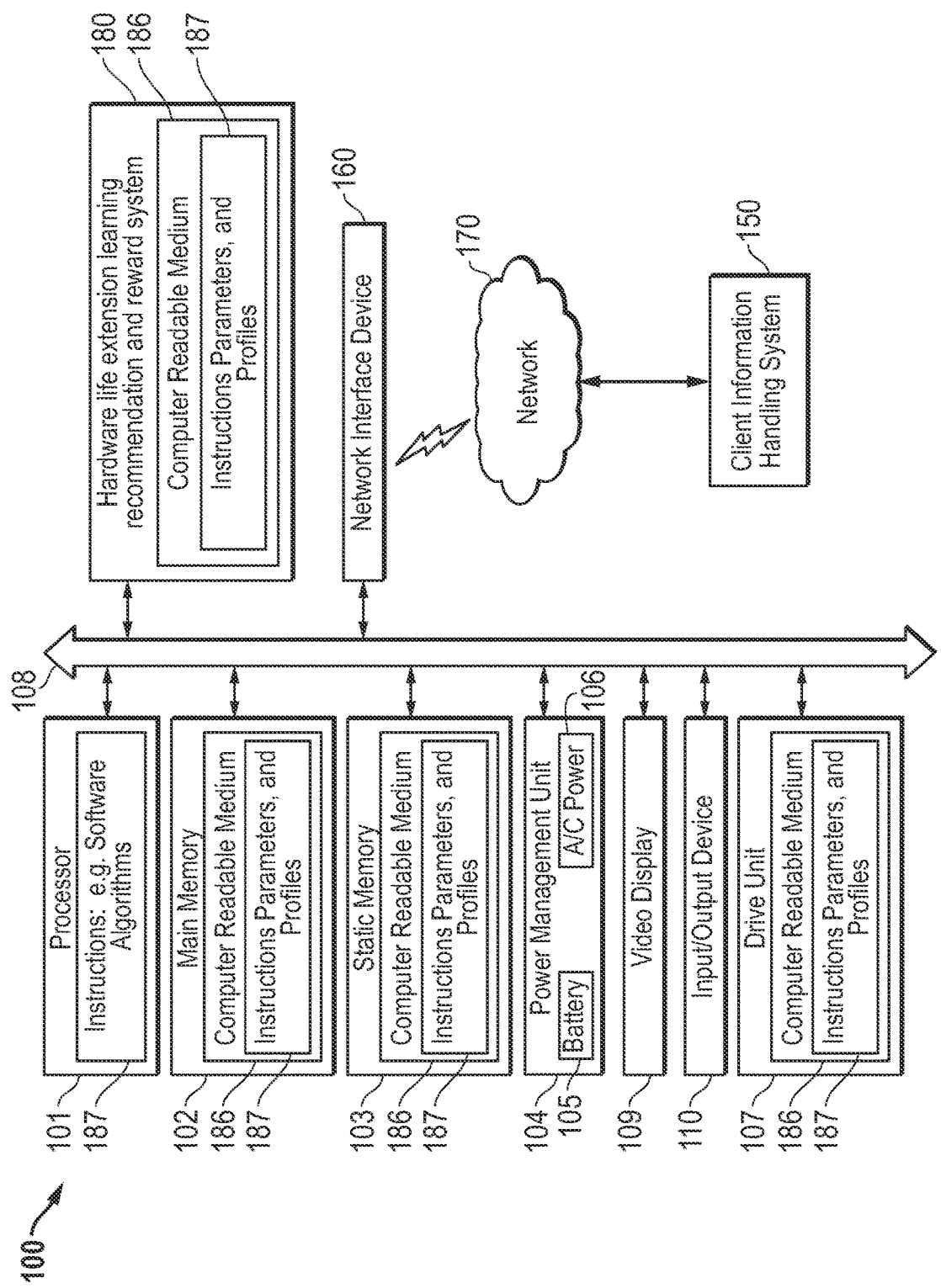
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Consumers are placing an ever increasing value on minimizing greenhouse gas (GHG) emissions generated during manufacture and usage of products they purchase. In other words, the size of GHG emissions generated during manufacture or use of a product is projected to sway an end consumer's purchasing decision to an increasingly large degree over the coming years. One major impact on such GHG emissions is the manufacture and transport of replacement parts, and disposal or recycling of underperforming parts to be replaced. The hardware life extension learning recommendation and reward system in embodiments of the present disclosure may address this issue by making recommendations to adjust software application usage at client information handling systems in order to extend the lifetimes of commonly replaced hardware components.

These recommendations may be based, in various embodiments described herein, on crowd-sourced data for previously user-approved adjustments to other client information handling systems that experienced similar hardware failures in the past. Further, the hardware life extension learning recommendation and reward system in various embodiments may only recommend adjustments that have been previously accepted and executed successfully by users, indicating user satisfaction. In such a way, the hardware life extension learning recommendation and reward system may decrease the likelihood of future recommendations negatively impacting user experience at other client information handling systems.

Additionally, the hardware life extension learning recommendation and reward system in embodiments described herein may reward users for accepting recommendations for extension of hardware component life. For example, the hardware life extension learning recommendation and reward system may measure the time by which an executed recommendation extended lifetime for an underperforming hardware component and estimate a credit value for that lifetime extension. Upon a later user of a separate information handling system executing the same recommendation to extend the life of the same type of underperforming hardware component, the hardware life extension learning recommendation and reward system may apply a credit equivalent to the estimated credit value for the expected lifetime extension of the later underperforming hardware component. In such a way, the hardware life extension learning recommendation and reward system in an embodiment of the present disclosure may classify information handling systems by similarity of operating environments, provide recommendations for extension of life for underperforming hardware components based on user-approved recommendations to other client devices experiencing similar hardware failures, and reward users for execution of such recommendations. Successful application of user-approved recommendations to extend hardware life may thus decrease GHG emissions associated with manufacture and transport of replacement parts and recycling, disposal, or refurbishment of underperforming hardware components.

FIG. 1 illustrates an information handling system 100 according to several aspects of the present disclosure. In particular, in the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), a server (e.g., blade server or rack server), a wired or wireless docking station for a mobile information handling system, a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a tablet computer, a desktop computer, an augmented reality system, a virtual reality system, a communications device, an access point (AP), a base station transceiver, a wireless telephone, a control system, a camera, a scanner, a printer, a personal trusted device, a web appliance, or any other suitable machine capable of executing a set of instructions (sequential or otherwise) that specify actions to be taken by that machine, and may vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the information handling system 100 may be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The information handling system 100 may include a memory 102, (with computer readable medium 186 that is volatile (e.g. random-access memory, etc.), nonvolatile memory (read-only memory, flash memory etc.) or any combination thereof), one or more processing resources, such as a central processing unit (CPU), a graphics processing unit (GPU), a Visual Processing Unit (VPU) or a Hardware Accelerator, any one of which may be the processor 101 illustrated in FIG. 1, hardware or software control logic, or any combination thereof. Additional components of the information handling system 100 may include one or more storage devices 103 or 107, a wireless network interface device 160, one or more communications ports for communicating with external devices, as well as various input and output (I/O) devices 110, such as a keyboard, a mouse, touchpad or any combination thereof. A power management unit 104 supplying power to the information handling system 100, via a battery 105 or an alternating current (A/C) power adapter 106 may supply power to one or more components of the information handling system 100, including the processor 101 executing code instructions of the hardware life extension learning recommendation and rewards system 180, the wireless network interface device 160, a static memory 103 or drive unit 107, a, a video display 109 or other components of an information handling system. The video display 109 in an embodiment may function as a liquid crystal display (LCD), an organic light emitting diode (OLED), a flat panel display, or a solid-state display. The information handling system 100 may also include one or more buses (e.g., 108) operable to transmit communications between the various hardware components. Portions of an information handling system 100 may themselves be considered information handling systems 100 in the embodiments presented herein.

Information handling system 100 may include devices or modules that embody one or more of the devices or execute instructions for the one or more systems and modules described herein, and operates to perform one or more of the methods described herein. The information handling system 100 may execute code instructions 187, such as for the hardware life extension learning recommendation and rewards system 180, that may operate on servers or systems, remote data centers, or on-box in individual client information handling systems 100 according to various embodiments herein. In some embodiments, it is understood any or all portions of code instructions 187 may operate on a plurality of information handling systems 100.

The information handling system 100 may include a processor 101 such as a central processing unit (CPU), a graphics processing unit (GPU), a Visual Processing Unit (VPU), or a hardware accelerator, embedded controllers or control logic or some combination of the same. Any of the processing resources may operate to execute code that is either firmware or software code. Moreover, the information handling system 100 may include memory such as main memory 102, static memory 103, containing computer readable medium 186 storing instructions 187. In some embodiments, information handling system 100, or portions thereof, may represent a client information handling system operating various hardware components (e.g., processor 101, memory 102, network interface device 160, power management unit 104) in need of occasional replacement, and executing an agent of the hardware life extension learning recommendation and reward system 180, as described in greater detail below with respect to FIG. 2. In other embodiments the information handling system 100 may represent a server information handling system a hardware life extension learning recommendation and reward system 180, operating system (OS) software, application software, BIOS software, or other software applications or drivers detectable by processor type 101.

The disk drive unit 107 and static memory 103 may also contain space for data storage in a computer readable medium 186. The instructions 187 in an embodiment may reside completely, or at least partially, within the main memory 102, the static memory 103, and/or within the disk drive 107 during execution by the processor 101. The information handling system 100 may also include one or more buses 108 operable to transmit communications between the various hardware components such as any combination of various input and output (I/O) devices 110, or the like.

The network interface device 160 may provide connectivity of the information handling system 100 to the network 170 via a dedicated link, a network AP or base station in an embodiment. The network 170 in other embodiments may be a wired local area network (LAN), a wireless personal area network (WPAN), a wireless Local Area Network (WLAN), such as a public Wi-Fi communication network, a private Wi-Fi communication network, or other non-cellular communication networks. In other embodiments, the network 170 may be a wired wide area network (WAN), a wireless wide area network (WWAN), such as a 4G LTE public network, or a 5G communication network, or other cellular communication networks, including future protocol communication networks such as upcoming 6G protocols under development. Connectivity to any of a plurality of networks 170, one or more APs for those networks, or to a docking station in an embodiment may be via wired or wireless connection. In some aspects of the present disclosure, the network interface device 160 may operate two or more wireless links. In other aspects of the present disclosure, the information handling system 100 may include a plurality of network interface devices, each capable of establishing a separate wireless link to network 170, such that the information handling system 100 may be in communication with network 170 via a plurality of wireless links.

The network interface device 160 may operate in accordance with any cellular wireless data communication standards. To communicate with a wireless local area network, standards including IEEE 802.11 WLAN standards, IEEE 802.15 WPAN standards, or similar wireless standards may be used. Utilization of radiofrequency communication bands according to several example embodiments of the present disclosure may include bands used with the WLAN standards which may operate in both licensed and unlicensed spectrums. For example, WLAN may use frequency bands such as those supported in the 802.11 a/h/j/n/ac/ax including Wi-Fi 6 and Wi-Fi 6e. It is understood that any number of available channels may be available in WLAN under the 2.4 GHz, 5 GHz, or 6 GHz bands which may be shared communication frequency bands with WWAN protocols in some embodiments.

The network interface device 160, in other embodiments, may connect to any combination of cellular wireless connections including 2G, 2.5G, 3G, 4G, 5G or the like from one or more service providers or privately administered by an enterprise. Utilization of radiofrequency communication bands according to several example embodiments of the present disclosure may include bands used with the WWAN standards, which may operate in both licensed and unlicensed spectrums. More specifically, the network interface device 160 in an embodiment may transceive within radio frequencies associated with the 5G New Radio (NR) Frequency Range 1 (FR1) or Frequency Range 2 (FR2). NRFR1 may include radio frequencies below 6 GHz, also sometimes associated with 4G LTE and other standards predating the 5G communications standards. NRFR2 may include radio frequencies above 6 GHz, made available within the emerging 5G communications standard. Frequencies related to the 5G networks may include high frequency (HF) band, very high frequency (VHF) band, ultra-high frequency (UHF) band, L band, S band, C band, X band, Ku band, K band, Ka band, V band, W band, and millimeter wave bands.

In some embodiments, software, firmware, dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations may include distributed processing, component/object distributed processing, and parallel processing. Alternatively, virtual computer system processing may be constructed to implement one or more of the methods or functionalities as described herein.

The present disclosure contemplates a computer-readable medium that includes instructions, parameters, and profiles 187 or receives and executes instructions, parameters, and profiles 187 responsive to a propagated signal, so that a device connected to a network 170 may communicate voice, video or data over the network 170. Further, the instructions 187 may be transmitted or received over the network 170 via the network interface device 160. The information handling system 100 may include a set of instructions 187 that may be executed to cause the computer system to perform any one or more of the methods or computer-based functions disclosed herein, such as classifying remote client information handling systems (e.g., 150) by similarity of operating environments, providing recommendations for extension of life for underperforming hardware components based on user-approved recommendations to other client devices within the same class, and rewarding users for execution of such recommendations. For example, instructions 187 may include a particular example of a hardware life extension learning recommendation and reward system 180, or other aspects or components. Various software modules comprising application instructions 187 may be coordinated by an operating system (OS), and/or via an application programming interface (API). An example operating system may include Windows®, Android®, and other OS types. Example APIs may include Win 32, Core Java API, or Android APIs. Application instructions 187 may also include any application processing drivers, or the like executing on information handling system 100.

The hardware life extension learning recommendation and rewards system 180 may utilize a computer-readable medium 186 in which one or more sets of instructions 187 may operate in part as software or firmware instructions executed on the information handling system 100. The instructions 187 may embody one or more of the methods or logic as described herein. For example, instructions relating to the hardware life extension learning recommendation and rewards system 180, firmware or software algorithms, processes, and/or methods may be stored here. Such instructions 187 may comprise providing recommendations for extension of life for underperforming hardware components based on user-approved recommendations to other client devices that previously experienced similar hardware failures, and rewarding users for execution of such recommendations. The hardware life extension learning recommendation and rewards system 180 may operate within a Unified Endpoint Management (UEM) platform that gathers telemetries from a plurality of client information handling system 150 endpoints via the network 170 that describe operating environments for those client information handling systems (e.g., 150). The UEM platform in an embodiment may operate to identify information technology (IT) issues at client information handling systems 150, and to provide support for such issues, including automatically updating drivers or hardware components, as needed. The UEM platform in an embodiment may operate as a cloud-based service to store data (e.g., operating environment telemetries for remote client information handling systems 150) within memory 102, static memory 103, or computer readable medium 186 received via network 170. In some embodiments the information handling system 100 may be a sever executing a UEM platform. In other embodiments, the information handling system 100 may depict a client information handling system (e.g., 150) that reports to a UEM and receives recommendations from the UEM pursuant to various embodiments described herein.

Main memory 102 may contain computer-readable medium (not shown), such as RAM in an example embodiment. An example of main memory 102 includes random access memory (RAM) such as static RAM (SRAM), dynamic RAM (DRAM), non-volatile RAM (NV-RAM), or the like, read only memory (ROM), another type of memory, or a combination thereof. Static memory 103 may contain computer-readable medium (not shown), such as NOR or NAND flash memory in some example embodiments. The instructions, parameters, and profiles 187 of the hardware life extension learning recommendation and rewards system 180 may be stored in static memory 103, or the drive unit 107 on a computer-readable medium 186 such as a flash memory or magnetic disk in an example embodiment. More specifically, telemetries describing heat measurements, executing software applications, and errors associated with one or more hardware components of client information handling systems (e.g., 150) may be stored within memory 102, static memory 103, or drive unit 107.

While the computer-readable medium is shown to be a single medium, the term "computer-readable medium" includes a single-medium or multiple-media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In some embodiments, dedicated hardware implementations such as application specific integrated circuits, programmable logic arrays and other hardware devices may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein may be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, controller, or module may include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module may also include a combination of the foregoing examples of hardware or software. In an embodiment an information handling system 100 may include an integrated circuit or a board-level product having portions thereof that may also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another may communicate directly or indirectly through one or more intermediaries.

Figure 2:
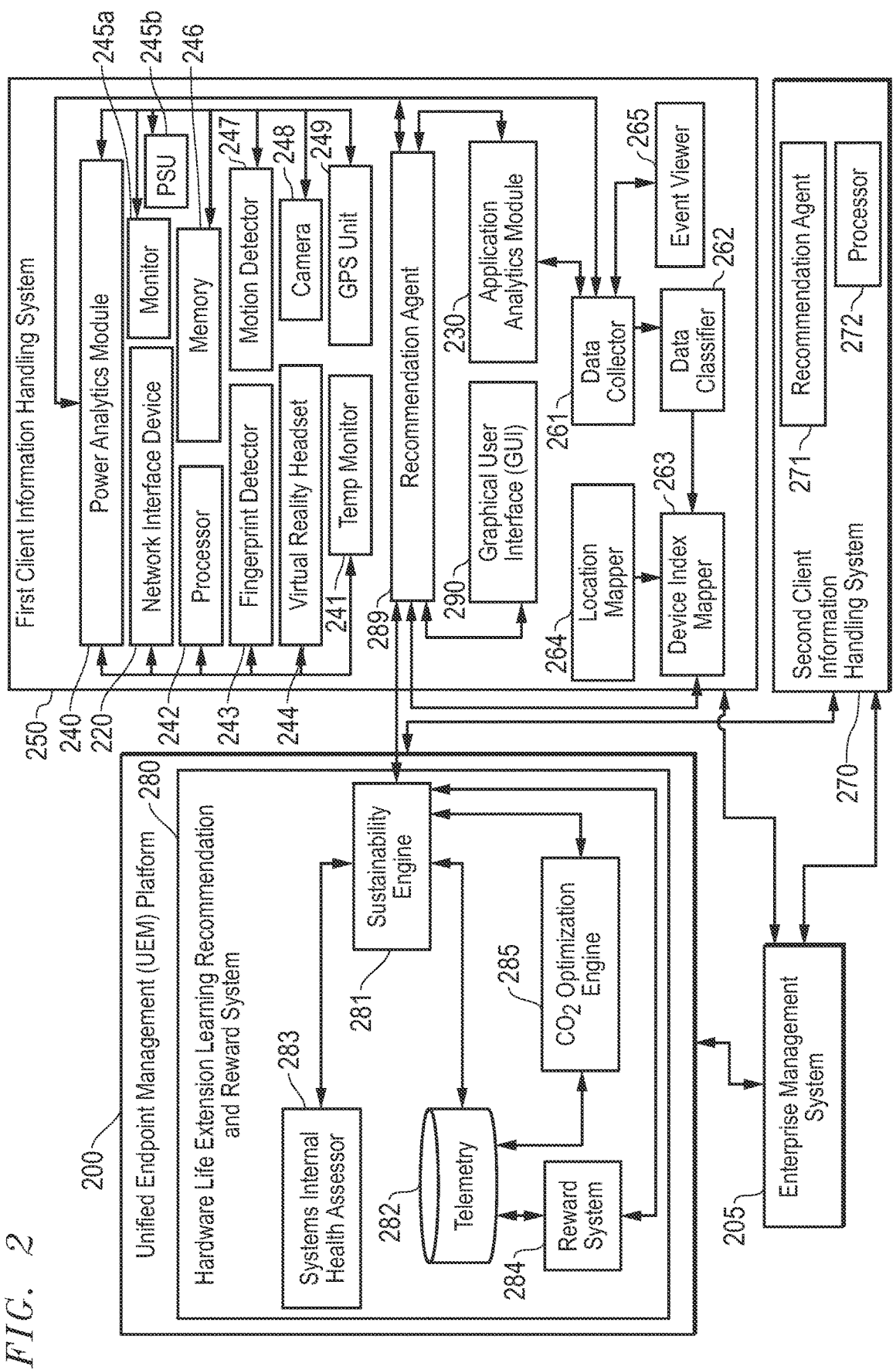
FIG. 2 is a block diagram illustrating a hardware life extension learning recommendation and reward system according to an embodiment of the present disclosure.

FIG. 2 is a block diagram illustrating a hardware life extension learning recommendation and reward system communicating recommended adjustments to operating environment of a remote client information handling system according to an embodiment of the present disclosure. A unified endpoint management (UEM) platform 200 in an embodiment may execute a hardware life extension learning recommendation and reward system 280 to extend hardware lifetimes at a plurality of client information handling systems (e.g., 250 and 270) under management of or in communication with an enterprise management system 230, which may act as an interface between the client information handling system (e.g., 250 or 270) and the UEM platform 200. The UEM platform 200 in an embodiment may operate as a cloud-based service in communication with the enterprise management system 230 via a network to identify information technology (IT) issues at a first client information handling system 250, or a second client information handling system 270. The UEM platform 200 and enterprise management system 230 may also provide support for such issues, including automatically updating drivers or hardware components, as needed. In a specific embodiment of the present disclosure, the UEM platform 200 may gather telemetries from a plurality of client information handling system (e.g., 250 and 270) that describe operating environments for those client information handling systems (e.g., heat measurements, failures or errors associated with one or more hardware components, or analytics for software usage).

A hardware life extension learning recommendation and reward system 280 operating at the UEM platform 200 in an embodiment may generate recommendations for software usage at a first client information handling system 250 for the purpose of extending a lifetime of one or more hardware components. These recommendations (e.g., for software usage at the first client information handling system 250) may be made based upon other recommendations previously accepted by a user of a second information handling system 270 to extend hardware lifetime at the second information handling system 270. For example, the user of the second client information handling system 270 in an embodiment may approve a recommendation to decrease usage of a specific software application (e.g., code compiling software application) received from the hardware life extension learning recommendation and reward system 280, via recommendation agent 271. Execution of such a recommendation for decrease in usage of the specific software application in an embodiment may include restricting access of resources for a given hardware component (e.g., capping calls made to the processor 272) made available to the specific software application (e.g., code compiling software). The user-approved decrease in usage of such an application in an embodiment may successfully extend the lifetime of the processor 272 of the second information handling system 270 by a measurable period (e.g., ten days). In such an example embodiment, the hardware life extension learning recommendation and reward system 280 may later provide the same recommendation (e.g., to decrease usage of a code compiling software application by limiting resources of a given hardware component made available to the code compiling software application) to the first client information handling system 250 in order to extend the lifetime of the processor 242, as described in greater detail below. The hardware life extension learning recommendation and reward system 280 in an embodiment may determine the recommendation approved at the second information handling system 270 will likely extend hardware lifetime at the first information handling system 250 based upon telemetry data gathered from a pool of information handling systems including 250, 270, and others in various embodiments. The hardware life extension recommendation and reward system 280 in an embodiment may use a machine learning approach to classify analytical performance data for each information handling system according to types of hardware and software errors, failures, or warnings.

The UEM platform 200 may receive such telemetries from a plurality of client information handling systems (e.g., 250 and 270), which may be managed by the same enterprise management system (e.g., 230), or may be managed by separate enterprise management systems in various embodiments. Each client information handling system (e.g., 250 or 270) in an embodiment may include a plurality of hardware components. For example, a first client information handling system 250 in an embodiment may include a network interface device 220, a processor (e.g., central processing unit (CPU), graphics processing unit (GPU), or visual processing unit (VPU)) 242, a monitor 245*a*, a memory 246, and one or more components of a power supply unit 245*b* (e.g., battery). In some embodiments, the first client information handling system 250 may further include one or more sensing devices, such as a fingerprint detector 243, a motion detector 247, location sensing devices 249 (e.g., GPS location unit), a temperature monitor or thermal measurement device 241, or camera 248, which may also be used during execution of videoconferencing software applications, for example. In another embodiment, the first client information handling system 250 may further be operably connected to one or more peripheral devices, such as a virtual reality headset 244, for example. Such an operably connection may employ a driver or firmware for such a peripheral device in such an embodiment. One or more of the other hardware components described herein (e.g., 220, 241, 242, 243, 244, 245*a*, 245*b*, 246, 247, 248, or 249) may further operate according to firmware or driver instructions in an embodiment.

A power analytics module 240 in an embodiment may be in communication with various hardware components (e.g., 220, 241, 242, 243, 244, 245*a*, 245*b*, 246, 247, 248, or 249) and firmware for those components in an embodiment. For example, the power analytics module 240 may monitor power consumption by each of the various hardware components (e.g., 220, 241, 242, 243, 244, 245*a*, 245*b*, 246, 247, 248, or 249) in an embodiment, as well as thermal measurements made by the temperature monitor 241 at various locations throughout the first client information handling system 250. In another example embodiment, the power analytics module 240 may also access firmware for hardware components (e.g., 220, 241, 242, 243, 244, 245*a*, 245*b*, 246, 247, 248, or 249) to determine policies or settings for those components at the time of such power measurements.

More specifically, the power analytics module 240 in an embodiment may determine whether a network interface device 220 is transceiving according to WLAN, WWAN, Bluetooth®, or Near Field Communication (NFC) standards, as well as policies setting a preference for one type of standard over another, or restrictions on power consumption, data rate, or frequencies used by the network interface device 220. In another example, the power analytics module 240 in an embodiment may determine current usage as a percentage of total capacity for the processor 242 (e.g., central processing unit (CPU), graphics processing unit (GPU), or visual processing unit (VPU)). In still another example, the power analytics module may determine current usage as a percentage of total capacity for memory 246, time required to process requests to access such memory 246, and identify software applications most frequently accessing such memory 246. In yet another example, the power analytics module 240 in an embodiment may determine a usage mode for the monitor 245*a*, such as day mode, night mode, power reserve mode, or gaming mode (e.g., high-resolution). In still another example embodiment, the power analytics module 240 may determine policies controlling the periods in which sensing hardware may be operational. More specifically, the power analytics module 240 in an embodiment may determine whether the fingerprint detector 243, motion detector 247, location sensing device (e.g., GPS unit) 249, or camera 248 are set to remain on at all times, to operate only when a laptop or mobile information handling system is in a certain position (e.g., closed or open), to operate when a mobile device is currently moving, or to operate only when a user is actively executing software applications or certain software applications. In yet another embodiment, the power analytics module 240 may determine the media capture instructions setting for the camera 248, indicating a resolution of captured images, a frequency at which those images are captured, and any processing algorithms that may be applied to those images (e.g., zooming, cropping, background image application, boundary recognition, face recognition, smoothing, etc.). All information accessed in such a way by the power analytics module 240 in an embodiment may be communicated to a data collector 261.

The power analytics module 240 in an embodiment may also be capable of adjusting such policies within firmware for one or more hardware components, upon user approval. For example, the power analytics module 240 in an embodiment may instruct a network interface device 220 to transceive according to the Bluetooth®, rather than WLAN or WWAN, or reset policies for the network interface device 220 to restrict power consumption, data rate, or frequencies used. In another example, the power analytics module 240 in an embodiment may adjust the usage mode for the monitor 245*a* to a lower power consumption mode, such as power reserve mode, or lower resolution mode. In still another example embodiment, the power analytics module 240 may decrease the periods in which sensing hardware may be operational, such as restricting such periods to when the first client information handling system 250 is in a closed position, an idle or sleep mode, currently moving, or in startup mode. In yet another embodiment, the power analytics module 240 may adjust the media capture instructions setting for the camera 248 by decreasing a resolution of captured images or a frequency at which those images are captured, or limiting execution of any processing algorithms that may be applied to those images (e.g., zooming, cropping, background image application, boundary recognition, face recognition, smoothing, etc.).

In an embodiment, the power analytics module 240 may also be capable of determining the current versions of drivers for various hardware components (e.g., 220, 241, 242, 243, 244, 245*a*, 245*b*, 246, 247, 248, or 249). In some embodiments, the power analytics module 240 may receive updated drivers, direct installation of those drivers, or pause repeated attempts at unsuccessful driver installations in order to increase efficiency of associated hardware components (e.g., 220, 241, 242, 243, 244, 245*a*, 245*b*, 246, 247, 248, or 249). In other embodiments, the power analytics module 240 may also identify and delete obsolete or redundant files associated with previously replaced or obsolete drivers, and track power consumed during installation or updating of such drivers. In still other embodiments, the power analytics module 240 may further determine power consumed during updates made to various software applications executing via the processor 242 (e.g., CPU, GPU, or VPU).

As described above, the power analytics module 230 may be in communication with a data collector 261, which may also be in communication with an application analytics module 230. In an embodiment, the application analytics module 230 may monitor and adjust execution of software applications within the operating system (OS) for the first client information handling system 250. The application analytics module 230 in an embodiment may further track which software applications are running or idle (e.g., executing in the background) at various times, and track current versions of software applications and times at which updates to such software applications are performed. In still another example, the application analytics module 230 may determine current usage as a percentage of total capacity for memory 246, time required to process requests to access such memory 246, and identify software applications most frequently accessing such memory 246. Information gathered by the application analytics module 230 in such an embodiment may be communicated to the data collector 261.

The application analytics module 230 in an embodiment may further direct operation of certain software applications, based on user approval. For example, the application analytics module 230 in an embodiment may cap the percentage of total capacity for the processor 242 or the memory 246 that may be used by specifically identified software applications, or terminate software applications submitting repeated interrupts to the CPU 242 or GPU 246. As another example, the application analytics module 230 in an embodiment may terminate or cap the percentage of total capacity for the processor 242 or memory 246 that may be used by idle or background applications.

As described herein, the data collector module 261 in an embodiment may gather data regarding hardware configuration and power consumption from the power analytics module 240 and data regarding software performance and processor/memory usage from the application analytics module 230. In some embodiments, the data collector may also gather information from an event viewer 265 (e.g., Microsoft® Event Viewer) tracking computing events relating to software, firmware, and hardware in real-time. Such events may include notification of errors relating to various attempted processes at the first client information handling system 250. More specifically, the event viewer 265 in an embodiment may record one or more Windows Hardware Error Architecture (WHEA) events indicating a hardware error. Such WHEA events may be associated with data packets that specifically identify the hardware component (e.g., 220, 241, 242, 243, 244, 245*a*, 245*b*, 246, 247, 248, or 249) producing the error. The data collector 261 may routinely collect information from each of the power analytics module 240, the application analytics module 230 or the event viewer 265 at preset intervals, or may do so upon notification by one of these modules (e.g., 230, 240, or 265) of a specific event, failure, or warning, such as a temperature measurement from temperature monitor 241 exceeding a preset maximum temperature threshold value.

Information recorded by the event viewer 265 in an embodiment may be output in the form of a log, while information recorded by the power analytics module 240 or the application analytics module 230 may be output into reports. The format of such a log or report may vary, which may require reformatting of such information into an easily classified, sorted, and searchable format. Thus, the data collector 261 in an embodiment may operate to reformat any received logs or reports into a predetermined data interchange format such as JavaScript Object Notation (JSON), of Extensive Markup Language (XML). Specific examples described herein may use the JSON format for consistency and ease of explanation, but any other type of existing or later developed predetermined data interchange format agreed upon between data sinks and sources may be used in various embodiments.

The data collector 261 in an embodiment may transmit information received at any given time from the power analytics module 240, application analytics module 230, or event viewer 265) and reformatted to a predetermined data interchange format (e.g., JSON) based to a data classifier 262. Such a JSON-formatted report or log may be referred to herein as a JSON event. Each JSON event may include any information gathered from the power analytics module 240, application analytics module 230, or event viewer 265 and a time stamp associated with either the time the analytics module report was generated, or the time at which a WHEA (or other known convention for categorizing processing events) error occurred. In some cases, a JSON event may include a single WHEA error (e.g., processor error), or a single notification or warning from an analytics module (e.g., temperature monitor 241 recorded a temperature exceeding a preset maximum temperature threshold value). In other cases, a JSON event may include routinely gathered information such as current configurations or policies for various hardware components (e.g., 220, 241, 242, 243, 244, 245a, 245b, 246, 247, 248, or 249) or software applications, power consumption of those components over a known monitoring time period, current versions of drivers or software applications, and timestamps for installation of updates to such drivers or software applications. Such information may be illustrated by the following table:

TABLE 1

| Timestamp | 1655156447 |
|---|---|
| Client Device ID | 123456 |
| Event ID | 456789 |
| Errors, notifications, warnings | Workload on processor: 90% WHEA error at processor Temperature above 150 degrees Fahrenheit |
| Location | Austin, TX |
| Model | Laptop 5400 |
| Hardware Configuration | WLAN network interface device; WWAN network interface device; Bluetooth ® network interface device; 16 GB memory; X series CPU; G Series GPU; 256 GB Solid State Drive (SSD); 15.6 inch full high definition (HD) organic light emitting diode (OLED) display; |
| Software Performance | Operating System 10.2; Video Conference Software Application using 90% antenna; Code Compiling Software Application using 90% CPU; Gaming Software Application using 90% GPU; |

Some or all of the information displayed above within TABLE 1 may be formatted as a JSON incident in an embodiment. Each row of the above table may be formatted as one or more JSON events within the JSON incident in an embodiment. A JSON incident may include a data node identifying an event ID, a source for the event (e.g., power analytics module 240, applications analytics module 230, or event viewer 265), a timestamp for that event, one or more custom flags identifying the errors, notifications, or warnings, and one or more device current states, identifying the software and hardware configurations. Any one of the rows of the JSON incident illustrated directly below may represent a JSON event. For example, such a data node depicting information from TABLE 1, above, may appear in a JSON incident as:

```
{
  "data" :
  {
    "event_id" : 456789,
    "source_ID" : power_analytics_module,
    "timestamp_unixtime_ms" : 1544145336,
    "custom_flags" :
    {
      "CPU_workload_code_compiling_software_app" : 0.90,
      "WHEA_Error" : CPU,
      "Temp" : 150_F,
    }
    "device_current_state :
```

```
    {
      "NID_1_type" : WLAN,
      "NID_2_type" : WWAN,
      "NID_3_type" : BT,
      "memory_type" : 16_GB,
      "CPU_type" : X_Series,
      "GPU_type" : G_Series,
      "SSD_type" : 256_GB,
      "Display_type" : 15.6_HD_OLED,
      "OS_Version" : 10.2
      "Video_Conference_App" : Active
      "Gaming_App" : Active
      "Code_Compiling_App" : Background
    }
  }
}
```

In other embodiments, TABLE 1 and the correlating JSON incident may further include identification of additional hardware components actively operating at the client information handling system 250, such as the fingerprint detector 243, motion detector 247, virtual reality headset 244, camera 248, temperature monitor 241, or GPS unit 249. The example given above in TABLE 1 and the corresponding above JSON incident may further include any number of other errors, notifications, or warnings, hardware configurations, software performance analytics, or descriptions of policies in place for hardware or software at the client information handling system 250, as monitored by either the power analytics module 240 or the application analytics module 230.

Upon reformatting of information in an embodiment, the data collector 261 may transmit the JSON incident to the data classifier 262. In an embodiment, the data classifier 262 may operate to analyze the contents of the JSON incident, to classify the type of JSON events included therewithin, and to edit the JSON incident to generate a second JSON incident that includes that classification type.

Classification types may be preset according to instructions received by the hardware life extension learning recommendation and reward system 280 by the recommendation agent 289. Such classification types may assist the sustainability engine 281 and systems internal health assessor 283 in determining recommendations to extend lifetimes of various hardware components by adjusting usage of specific software applications, as described in greater detail below. For example, the hardware life extension learning recommendation and reward system 280 may make recommendations based on information describing hardware workloads, software application usage, and background software application usage). Any errors associated with these areas may be integral to generating successful recommendations for extension of hardware life through adjustments to software application usage. Thus, each of these information types may be associated with a separate preset classification type. In other embodiments, other classification types, such as software resource use, hardware configuration, or driver performance, may be preset and available for use in classifying JSON incidents received from the data collector 261.

Incident classifications in an embodiment may be associated with one or more previously identified event values. For example, an incident classification for "workload," identifying relatively high workloads that may result in various hardware component failures in an embodiment may be associated by the hardware lifetime extension learning recommendation and reward system 280 with JSON events titled "CPU_workload_code_compiling_software_app" having a value exceeding 85%. In another example, an incident classification for "Config," identifying a hardware configuration or policy that may result in various hardware component failures in an embodiment may be associated with JSON events titled "Config," having a value such as "full_power_mode" (e.g., indicating full power supplied to the monitor), "active_sensing_mode" (e.g., indicating sensing hardware components set to remain on), "High_Definition_Mode" (e.g., indicating GPU or monitor set to display in high definition). In yet another example, an incident classification for "app_usage," identifying relatively intensive usage of software applications that may result in various hardware component failures in an embodiment may be associated with JSON events titled "App_usage" having a value exceeding 85%. In still another example, an incident classification for "driver_performance," identifying poor or inefficient driver performance (e.g., as indicated by a percentage of calls to that driver resulting in an error over a preset time period) that may result in various hardware component failures in an embodiment may be associated with JSON events titled "driver_perf" having a value exceeding 50%. In yet another example, an incident classification for "background_usage," identifying relatively intensive usage of software applications operating in idle mode or in the background that may result in various hardware component failures in an embodiment may be associated with JSON events titled "background_usage" having a value exceeding 85%. Any numerical or percentage maximum application usage threshold values preset as described directly above may be set to any number between one and one hundred in various embodiments described herein.

In an example embodiment, the data classifier 262 in an embodiment may analyze the JSON incident described above to identify whether any of the JSON events and values associated with preset incident classifiers appear within the JSON incident. For example, the data classifier 262 in an embodiment may determine the JSON incident described above includes the JSON event named "CPU_workload," having a value of 0.90, or 90%, which is greater than the preset maximum CPU workload of 85%. The data classifier 262 in such an embodiment may further identify the JSON event named "Temp," having a value of 150_F. In some embodiments, the data classifier 262 may only apply an incident classifier for use by the hardware lifetime extension learning recommendation and reward system upon initial determination that a JSON event named "Temp" has a value exceeding a preset maximum internal temperature threshold (e.g., 150 degrees Fahrenheit) associated with known hardware component failures. In such an embodiment, the data classifier 262 in an embodiment may classify the JSON incident described above as "workload," indicating a high detected workload may be causing increased temperatures and decreased efficiency or functionality of one or more hardware components. The data classifier 262 in an embodiment may apply such a classification by editing the JSON incident received from the data collector 261 to generate a classified JSON incident that includes the following incident classification, in addition to the data nodes described above, within the JSON incident:

```
{
  "incident_class" : Workload
}
```

The classified JSON incident in an embodiment may be transmitted to the device index mapper 263, which may operate to associate the classified JSON incident with a device ID and device model for the first client information handling system 250. Such a device ID in an embodiment may be one of several device IDs for a plurality of information handling systems (e.g., including the first and second client information handling systems 250 and 270) stored at the UEM platform 200. In some embodiments, the device index mapper 263 may also retrieve a location for the first client information handling system 250 from the location mapper 264 or the GPS unit 249. In some cases, the location mapper 264 may represent the location of the first client information handling system 250 with reference to its location within a campus of an enterprise. More specifically, the first client information handling system 250 may be located on a specific floor of a specific building. The device index mapper 263 in an embodiment may then edit the classified JSON incident to generate an indexed and classified JSON incident that includes this information, such as shown directly below, which is then transmitted to the recommendation agent 289, and then to the sustainability engine 281 of the UEM platform 200:

```
{
  "data" :
  {
    "client_device_ID" : 123456,
    "client_device_model" : Laptop_5400,
    "event_id" : 456789,
    "source_ID" : power_analytics_module,
    "timestamp_unixtime_ms" : 1544145336,
    "location" : Austin_Texas,
    "custom_flags" :
    {
      "CPU_workload_code_compiling_software_app" : 0.90,
      "WHEA_Error" : CPU,
      "Temp" : 150_F,
    }
    "device_current_state :
    {
      "NID_1_type" : WLAN,
      "NID_2_type" : WWAN,
      "NID_3_type" : BT,
      "memory_type" : 16_GB,
      "CPU_type" : X_Series,
      "GPU_type" : G_Series,
      "SSD_type" : 256_GB,
      "Display_type" : 15.6_HD_OLED,
      "OS_Version" : 10.2
      "Video_Conference_App" : Active
      "Gaming_App" : Active
      "Code_Compiling_App" : Background
    }
  }
  "incident_class" : Workload
}
```

The hardware life extension learning recommendation and reward system 280 operating at the UEM platform 200 in an embodiment may include a sustainability engine 281, telemetry storage 282, a systems internal health assessor 283, a reward system 284, and a CO2 optimization engine 285. The sustainability engine 281 in an embodiment may operate to routinely gather indexed and classified JSON incidents from recommendation agents (e.g., 289 and 271) operating at a plurality of information handling systems (e.g., 250, and 270, respectively). Each indexed and classified JSON incident thus received in an embodiment may be stored in telemetry 282 for later analysis by the Systems Internal Health Assessor (SIHA) 283 or the hardware life extension learning recommendation and reward system 280.

Such telemetry may also include information such as an equivalent CO2 emissions value determined at one or more client information handling systems (e.g., 250) resulting from usage of software applications, or known statistics for GHG emissions due to power consumption in the measured location of a client information handling system (e.g., 250).

The SIHA 283 in an embodiment may search telemetry 282 data to identify indications within the indexed and classified JSON incidents of hardware failures, errors, or underperformance at reporting client information handling systems (e.g., 250 or 270). For example, the SIHA 283 in an embodiment may search the indexed and classified JSON incident described above, which has been transmitted to the sustainability engine 281 and stored in telemetry 282 to identify the JSON event named "WHEA_Error," having a value CPU, indicating an error at the CPU. As described above, any of a number of WHEA or other conventionally recorded errors may appear within indexed and classified JSON incidents and may identify any of the hardware components (e.g., 220, 241, 242, 243, 244, 245a, 245b, 246, 247, 248, or 249) operating at the client information handling system 250 in an embodiment. Upon identification of such an error associated with an identified hardware component, the SIHA 283 may transmit a notification to the sustainability engine 281 that the indexed and classified JSON incident (e.g., identified by event id given within the indexed and classified JSON incident) indicates poor health of a hardware component.

The sustainability engine 281 in an embodiment may operate to recommend adjustments to software usage at a client information handling system (e.g., 250) reporting poor hardware health in the form of an indexed and classified JSON incident flagged by the SIHA, as described directly above. For example, in an embodiment described in greater detail below with respect to FIG. 4, the sustainability engine 281 may identify one or more software applications whose execution could cause the poor hardware health identified in the indexed and classified JSON incident flagged by the SIHA and recommend decreased usage of those applications. In another example embodiment described in greater detail below with respect to FIG. 4, the sustainability engine 281 may identify recommendations previously made by the sustainability engine 281 based on a prior indexed and classified JSON incident of the same incident classification, and accepted by a user of another client information handling system (e.g., 270). In such embodiments, the sustainability engine 281 may transmit determined recommendations to the recommendation agent 289 of the client information handling system 250.

The sustainability engine 281 in some embodiments may reference a recommendation validation score associated with this recommendation and describing the frequency with which such a recommendation has been either accepted or rejected by users in the past, prior to transmitting such a recommendation to an information handling system currently experiencing failure of underperformance of that hardware component (e.g., 220, 241, 242, 243, 244, 245a, 245b, 246, 247, 248, or 249). For example, after determining at a sustainability engine 281 that a recommended adjustment to software usage at a client information handling system (e.g., 250) reporting poor hardware health is applicable and in the form of an indexed and classified JSON incident flagged by the SIHA, the sustainability engine 281 may ensure the validation score associated with that recommendation meets a preset validation score minimum threshold before transmitting the recommendation to any further client information handling systems. The recommendation score may be stored with the recommendation associated with the indexed and classified JSON incident in an embodiment.

The sustainability engine 281 in such an embodiment may further generate a recommendation JSON incident incorporating all of the information from the indexed and classified JSON incident received from the client information handling system 250 described above and additionally describing the transmitted recommendation. For example, the sustainability engine 281 may store a new recommendation JSON incident in telemetry 282 pointing to the indexed and classified JSON incident described above that included a JSON event named "event ID," and a value of 456789. As shown directly below, such a new recommendation JSON incident may further include a new event identification (e.g., 789456) identifying the new recommendation JSON incident individually, a timestamp associated with the time at which the recommendation was transmitted to the recommendation agent at the first information handling system 250, what the recommendation was (e.g., decrease usage of the code compiling application by 10% by decreasing the number of calls the code compiling application may make to the processor 242 by ten percent), and the incident classification of the original indexed and classified JSON incident that prompted the recommendation:

```
{
    "data" :
    {
        "event_id" : 789456,
        "timestamp_unixtime_ms" : 1655156447,
        "custom_flags" :
        {
            "incident_event_id" : 456789
            "Recommendation" :
            "decrease_usage_code_compiling_app_0.01"
        }
    }
    "incident_class" : Workload
}
```

The recommendation agent 289 in an embodiment may receive the recommendation from the sustainability engine 281, and prompt the user of the client information handling system 250 to either accept or reject implementation of that suggestion via the GUI 290. For example, the GUI 290 may allow the user to select a button or field for approval or denial of a recommendation to reduce usage of a code compiling software application by 10% in order to extend the lifetime of the processor 242. The recommendation agent 290 may transmit to the sustainability engine 281 a digital token indicating acceptance of the recommendation in an embodiment in which the user accepts the recommendation via the GUI 290. In some embodiments, the recommendation agent 290 may also transmit to the sustainability engine 281 a notification indicating rejection of the recommendation when the user rejects the recommendation via the GUI 290.

Upon receipt of such a token indicating that the user accepts the recommendation at the sustainability engine 281, the sustainability engine 281 in an embodiment may determine an estimated credit value associated with acceptance of the recommendation by the user of the first client information handling system 250 in an embodiment. Such an estimation may be made, for example, based on previous extensions of hardware lifetimes at other client information handling systems (e.g., 270) due to implementation of the same recommendation. As described above, prior to the hardware life extension learning recommendation and reward system 280 transmitting the recommendation to the first client information handling system 250, the user of the second client information handling system 270 in an embodiment may approve a recommendation to decrease usage of a specific software application (e.g., code compiling software application) by restricting access of resources for a given hardware component (e.g., capping calls made to the processor 272) made available to the specific software application (e.g., code compiling software). This user-approved decrease in usage of such an application in an embodiment may have successfully extended the lifetime of the processor 272 of the second information handling system 270 by a measurable period. In such an example embodiment, the sustainability engine 281 may determine the length of the hardware life extension for the processor 272 resulting from the previous recommendation through reference to further telemetry routinely gathered from the second client information handling system 270 until the processor 272 was ultimately replaced. For example, the sustainability engine 281 may determine the previous recommendation extended the lifetime of the processor 272 at the second information handling system 270 by ten days. In such an example embodiment, the sustainability engine 281 may further determine a credit value for such a lifetime extension by dividing the purchase price of processor 272 by the known average lifetime (in days) of other processors of the same type as processor 272, and multiplying that value by the determined lifetime extension (e.g., ten days). For example, extending the lifetime of a processor 272 originally costing $500 with a predicted lifetime of two years by ten days may result in estimated credit value savings of $6.85.

Upon determination of the credit value of previous hardware lifetime extensions made possible by the recommendation accepted at the first client information handling system 250 (e.g., as indicated by receipt of the digital token from the first client information handling system 250), the sustainability engine 281 may generate a reward JSON incident referencing the previously stored recommendation JSON incident and identifying the determined credit value associated with acceptance of the recommendation referenced in the recommendation JSON incident. For example, the sustainability engine 281 may generate the following reward JSON incident:

```
{
    "data" :
    {
        "event_id" : 159753,
        "timestamp_unixtime_ms" : 1877378669,
        "custom_flags" :
        {
            "recommendation_event_id" : 789456
            "Dig_Token" : "KLkJ2h34rxBg"
            "Reward" : 6.85_US_Dollars
        }
    }
    "incident_class" : Workload
}
```

As shown directly above, the reward JSON incident may point to the recommendation JSON incident described above that included a JSON event named "event ID," and a value of 789456. Such a reward JSON incident may further include a new event identification (e.g., 159753) identifying the reward JSON incident individually, a timestamp associated with the time at which the digital token was transmitted from the recommendation agent at the first information handling system 250, the digital token received from the first information handling system 250 indicating acceptance of the recommendation, what the reward value was (e.g., $6.85), and the incident classification of the original indexed and classified JSON incident and the recommendation JSON incident that prompted the reward.

The sustainability engine 281 in an embodiment may also apply a credit equivalent to the credit value stored within the reward JSON incident to an account associated with the user of the first client information handling system 250 or an operator within the enterprise management system 230, for example. More specifically, such a credit may be applied directly to a bank account in the form of digital currency, or may be applied to a user loyalty account in the form of either digital currency or as a voucher or coupon for the future purchase of services or products.

In some embodiments, the sustainability engine 281 may adjust a recommendation validation score associated with the recommendation, based on receipt of a digital token indicating acceptance of the recommendation by a user, or a notification that the user has rejected the recommendation. Such a recommendation validation score in an embodiment may indicate a number of times (or percentage of times) that a user has either accepted or rejected a recommendation to limit resources of a given hardware component (e.g., 220, 241, 242, 243, 244, 245a, 245b, 246, 247, 248, or 249) made available to a specific software application (e.g., code compiling software application) in order to extend lifetime of the given hardware component. As described above, the sustainability engine 281 in some embodiments may reference this recommendation validation score prior to transmitting such a recommendation to an information handling system currently experiencing failure of underperformance of that hardware component (e.g., 220, 241, 242, 243, 244, 245a, 245b, 246, 247, 248, or 249). For example, after determining at a sustainability engine 281 a recommend adjustment to software usage at a client information handling system (e.g., 250) reporting poor hardware health in the form of an indexed and classified JSON incident flagged by the SIHA, the sustainability engine 281 may ensure the validation score associated with that recommendation meets a preset validation score minimum threshold before transmitting the recommendation to any further client information handling systems. In such a way, the hardware life extension learning recommendation and reward system in an embodiment of the present disclosure may classify information handling systems by similarity of operating environments, provide recommendations for extension of life for underperforming hardware components based on user-approved recommendations to other client devices experiencing similar hardware failures, and reward users for execution of such recommendations.

Figure 3:
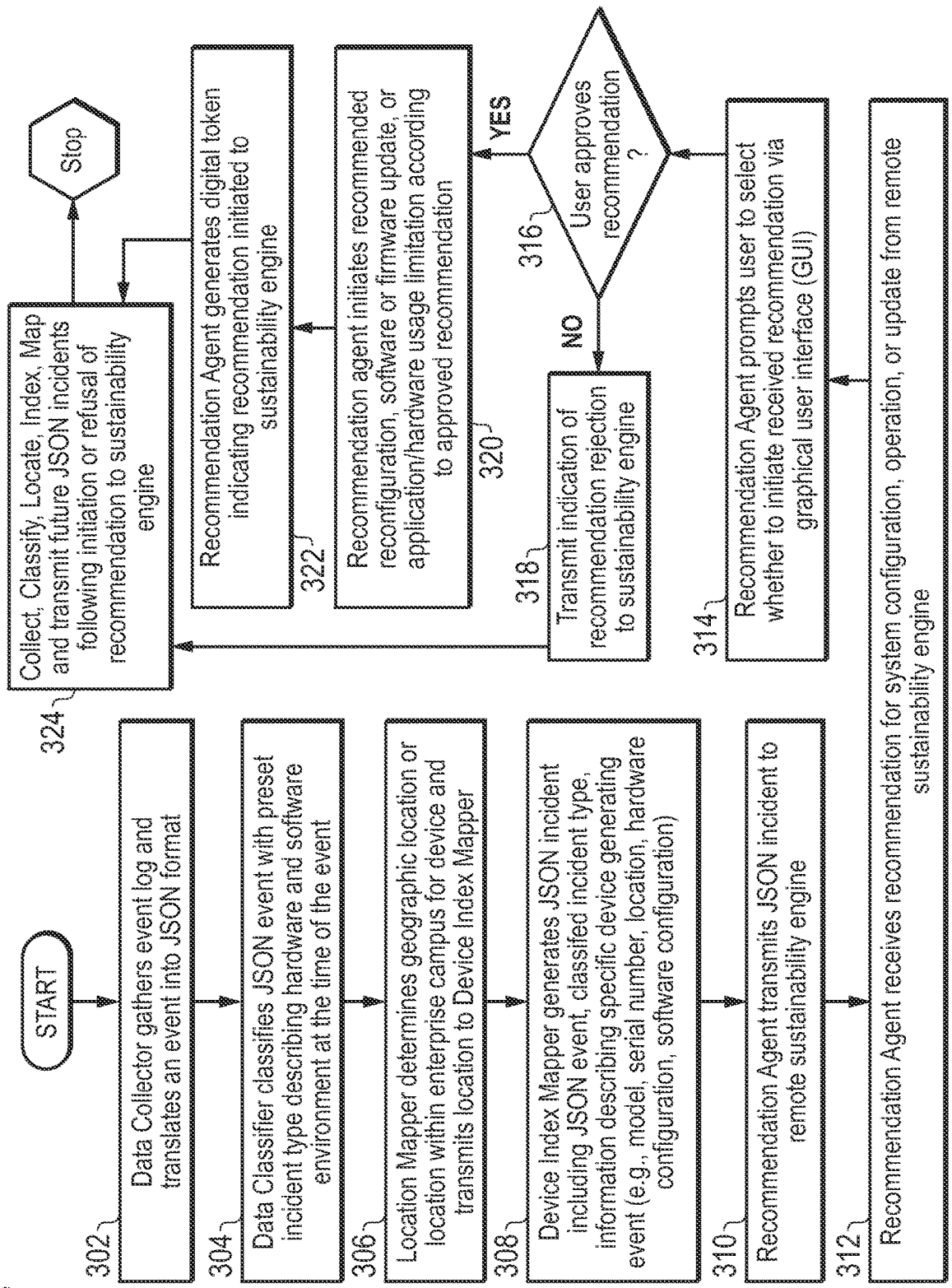
FIG. 3 is a flow diagram illustrating a method of transmitting telemetry data for a client information handling system according to an embodiment of the present disclosure.

FIG. 3 is a flow diagram illustrating a method of transmitting telemetry data describing an operating environment of a client information handling system and receiving recommendations for adjustment of the operating environment according to an embodiment of the present disclosure. As described herein, the hardware life extension learning recommendation and reward system in an embodiment may determine recommendations to adjust usage of software applications by limiting resources of a given hardware component made available to that software application at client information handling systems in order to extend the lifetimes of commonly replaced hardware components. These recommendations may be based, in various embodiments described herein, on crowd-sourced telemetry data for previously user-approved adjustments to other client information handling systems experiencing similar hardware component failures. FIG. 3 may describe collection of telemetry data across a large pool of client information handling systems necessary to make such determined recommendations.

At block 302, a data collector of a client information handling system in an embodiment may gather event log data, or reports from analytics engines such as hardware analytics applications or software analytics applications, and translate these logs or reports into a predetermined data interchange format such as JavaScript Object Notation (JSON), Extensive Markup Language (XML), or Yet Another Markup Language (YAML). Any format may be used, but JSON is discussed herein by way of an example embodiment. For example, in an embodiment described with reference to FIG. 2, above, the data collector 261 may gather reports from the power analytics module 240 and the application analytics module 230 and event logs from the event viewer 265. The data collector 261 in such an embodiment may further translate these reports and logs into JSON incidents for later parsing, searching, and editing by various components of the first client information handling system 250 and the hardware life extension learning recommendation and reward system 280. For example, the data collector 261 may generate the following JSON incident based on the information gathered and stored in Table 1, above:

```
{
  "data" :
  {
    "event_id" : 456789,
    "source_ID" : power_analytics_module,
    "timestamp_unixtime_ms" : 1544145336,
    "custom_flags" :
      {
        "CPU_workload_code_compiling_software_app" : 0.90,
        "WHEA_Error" : CPU,
        "Temp" : 150_F,
      }
    "device_current_state :
      {
        "NID_1_type" : WLAN,
        "NID_2_type" : WWAN,
        "NID_3_type" : BT,
        "memory_type" : 16_GB,
        "CPU_type" : X_Series,
        "GPU_type" : G_Series,
        "SSD_type" : 256_GB,
        "Display_type" : 15.6_HD_OLED,
        "OS_Version" : 10.2
        "Video_Conference_App" : Active
        "Gaming_App" : Active
        "Code_Compiling_App" : Background
      }
  }
}
```

The data classifier in an embodiment may classify objects within the gathered JSON event with preset incident types describing heat measurements, hardware component failures, or software application execution and usage for the client information handling system at the time of the event at block 304. For example, the data classifier 262 in an embodiment may edit the JSON incident created at block 302 by adding an incident classifier. More specifically, the data classifier 262 in an embodiment may analyze the JSON incident generated at block 302 to identify whether any of the JSON events and values associated with preset incident classifiers appear within the JSON incident. For example, the data classifier 262 in an embodiment may determine the JSON incident described above includes the JSON event named "CPU_workload," having a value of 0.90, or 90%, which is greater than the preset maximum CPU workload of 85%. In such an embodiment, the data classifier 262 in an embodiment may classify the JSON incident described above as "workload," indicating a high detected workload may be causing increased temperatures and decreased efficiency or functionality of one or more hardware components. The data classifier 262 in an embodiment may apply such a classification by editing the JSON incident received from the data collector 261 to generate a classified JSON incident:

```
{
  "data" :
  {
    "event_id" : 456789,
    "source_ID" : power_analytics_module,
    "timestamp_unixtime_ms" : 1544145336,
    "custom_flags" :
      {
        "CPU_workload_code_compiling_software_app" : 0.90,
        "WHEA_Error" : CPU,
        "Temp" : 150_F,
      }
    "device_current_state :
      {
        "NID_1_type" : WLAN,
        "NID_2_type" : WWAN,
        "NID_3_type" : BT,
        "memory_type" : 16_GB,
        "CPU_type" : X_Series,
        "GPU_type" : G_Series,
        "SSD_type" : 256_GB,
        "Display_type" : 15.6_HD_OLED,
        "OS_Version" : 10.2
        "Video_Conference_App" : Active
        "Gaming_App" : Active
        "Code_Compiling_App" : Background
      }
  }
  "incident_class" : Workload
}
```

In other embodiments, the classified JSON incident may reference other incident classifications. For example, the classified JSON incident may reference an incident classification for "Config," identifying a hardware configuration or policy that may result in various hardware component failures. The classification JSON event name "Config" in such an embodiment may have a value such as "full_power_mode" (e.g., indicating full power supplied to the monitor), "active_sensing_mode" (e.g., indicating sensing hardware components set to remain on), "High_Definition_Mode" (e.g., indicating GPU or monitor set to display in high definition). In another example, the classified JSON incident may reference an incident classification for "app_usage," identifying relatively intensive usage of software applications that may result in various hardware component failures in an embodiment. The classification JSON event name "app_usage" in such an embodiment may have a value exceeding 85%. In still another example, the classified JSON incident may reference an incident classification for "driver performance," identifying poor or inefficient driver performance (e.g., as indicated by a percentage of calls to that driver resulting in an error over a preset time period) that may result in various hardware component failures in an embodiment. The classification JSON event name "driver performance" in such an embodiment may have a value exceeding 50%. In yet another example, the classified JSON incident may reference an incident classification for "background_usage," identifying relatively intensive usage of software applications operating in idle mode or in the background that may result in various hardware component failures in an embodiment. The classification JSON event name "background_usage" in such an embodiment may have a value exceeding 85%.

At block 306, a location mapper of the client information handling system may determine a geographic location or location within an enterprise campus for the client information handling system and transmit the location to the device index mapper in an embodiment. For example, the device index mapper 263 may retrieve a location for the first client information handling system 250 from the location mapper 264 or the GPS unit 249. In some cases, the location mapper 264 may represent the location of the first client information handling system 250 with reference to its location within a campus of an enterprise. More specifically, the first client information handling system 250 may be located on a specific floor of a specific building.

The device index mapper in an embodiment may generate a JSON incident including one or more JSON events and classified incident types at block 308. For example, the device index mapper 263 in an embodiment may associate the classified JSON incident with a device ID and device model for the first client information handling system 250. Such a device ID in an embodiment may be one of several device IDs for a plurality of information handling systems (e.g., including the first and second client information handling systems 250 and 270) stored at the UEM platform 200. The device index mapper 263 in an embodiment may then edit the classified JSON incident to generate an indexed and classified JSON incident that includes this information:

```
{
  "data" :
  {
    "client_device_ID" : 123456,
    "client_device_model" : Laptop_5400,
    "event_id" : 456789,
    "source_ID" : power_analytics_module,
    "timestamp_unixtime_ms" : 1544145336,
    "location" : Austin_Texas,
    "custom_flags" :
    {
      "CPU_workload_code_compiling_software_app" : 0.90,
      "WHEA_Error" : CPU,
      "Temp" : 150_F,
    }
    "device_current_state :
    {
      "NID_1_type" : WLAN,
      "NID_2_type" : WWAN,
      "NID_3_type" : BT,
      "memory_type" : 16_GB,
      "CPU_type" : X_Series,
      "GPU_type" : G_Series,
      "SSD_type" : 256_GB,
      "Display_type" : 15.6_HD_OLED,
      "OS_Version" : 10.2
      "Video_Conference_App" : Active
      "Gaming_App" : Active
      "Code_Compiling_App" : Background
    }
  }
  "incident_class" : Workload
}
```

At block 310, a recommendation agent of the client information handling system may transmit the JSON incident generated at block 308 to a remote sustainability engine of the hardware life extension learning recommendation and rewards system in an embodiment. For example, the recommendation agent 289 of the first client information handling system 250 in an embodiment described with reference to FIG. 2 may transmit the above indexed and classified JSON incident to the sustainability engine 281 operating at the UEM platform 200. As described in an embodiment with reference to FIG. 1, the hardware life extension learning recommendation and rewards system 180 may operate within the UEM platform that gathers telemetries from a plurality of client information handling system endpoints 150 via the network 170, that describe operating environments for those client information handling systems (e.g., 150). The UEM platform in an embodiment may operate as a cloud-based service to store data (e.g., operating environment telemetries for remote client information handling systems 150) within memory 102, static memory 103, or computer readable medium 186 received via network 170.

The recommendation agent at the client information handling system in an embodiment may receive a recommendation for adjustment to software application usage at the client information handling system at block 312. For example, returning to the example embodiment described with reference to FIG. 2, the recommendation agent 289 for the first information handling system 250 may receive the following recommendation JSON incident from the sustainability engine 281, as described in greater detail below with respect to FIG. 4 at blocks 412 and 414:

```
{
  "data" :
  {
    "event_id" : 789456,
    "timestamp_unixtime_ms" : 1655156447,
    "custom_flags" :
    {
      "incident_event_id" : 456789
      "Recommendation" :
      "decrease_usage_code_compiling_app_0.01"
    }
  }
  "incident_class" : Workload
```

As shown directly above, the recommendation JSON incident may indicate a recommendation to decrease the usage of the processing resources for the code compiling application by ten percent from a detected value of 90%. Such a recommendation in an embodiment may decrease the usage of CPU resources by the code compiling application to 80%, which may be below the preset maximum application usage threshold value of 85%, for example. In other embodiments, the recommendation may apply to other software applications (e.g., video conferencing applications, gaming applications) currently consuming resources of various hardware components (e.g., CPU, GPU, VPU, network interface device (NID)). Also, the recommended percentage of decrease may vary. For example, the recommendation may be to decrease usage (e.g., by restricting resources of the given hardware component made available to the specific software application) by less than ten percent or to terminate usage of certain applications (e.g., background applications) entirely and focus the client information handling system for other tasks in the enterprise to extend lifetime of parts.

At block 314, the recommendation agent may prompt the user of the client information handling system, via a graphical user interface (GUI) to select whether to initiate the received recommendation in an embodiment. For example, the recommendation agent 289 in an embodiment may prompt the user, via GUI 290, to either accept or reject a recommendation identified directly above in the recommendation JSON incident to decrease the usage of the code compiling application by ten percent.

The recommendation agent in an embodiment may determine at block 316 whether the user has approved the received recommendation. In an embodiment in which the user has selected to accept the recommendation via the GUI 290, the client recommendation agent 289 may transmit an indication of the selection to the UEM platform 200. If the user has not approved the recommendation for adjustment of software application usage from the hardware life extension learning recommendation and reward system, this may indicate user concern that the adjustment may degrade user experience, and the method may proceed to block 318 to transmit an indication of rejection to the sustainability engine. If the user has approved the recommendation for adjustment of software application usage received from the hardware life extension learning recommendation and reward system, the method may proceed to block 320 for execution of the recommended adjustment.

At block 318, in an embodiment in which the user has not approved the recommendation for adjustment for software application usage received from the hardware life extension learning recommendation and reward system, the recommendation agent may transmit an indication of the recommendation rejection to the sustainability engine. Such a rejection may indicate user concern that the adjustment may degrade user experience. The method may then proceed to block 324 for routine collection, classification, location, index mapping, and transmission of future JSON incidents to the sustainability engine.

In an embodiment in which the user has approved the recommendation for adjustment to software application usage received from the hardware life extension learning recommendation and reward system via the recommendation agent, the recommendation agent may initiate the recommended adjustment at block 320. For example, in an embodiment in which the recommendation was to decrease usage of CPU resources by a code compiling software application, the recommendation agent 289 may transmit an instruction to application analytics module 230 to limit the calls made to the processor 242 by the code compiling software application. In other embodiments, the recommendation agent 289 may transmit similar instructions to the application analytics module 230 to limit the calls made to the processor 242 by any percentage identified within the recommendation by various specifically identified software applications (e.g., video conferencing application, gaming application). In still other embodiments, the recommendation agent 289 may transmit instructions to the application analytics module 230 to limit calls made to various other components (e.g., power supply unit 245*b* (104 from FIG. 1), network interface device (NID) 220, memory 246) by any specifically identified software application. This acceptance of a recommendation by a user may then result in a reward as discussed in various embodiments herein.

At block 322, the recommendation agent may generate a digital token indicating the recommended adjustment received from the hardware life extension learning recommendation and reward system has been made in an embodiment. In an example embodiment described with reference to FIG. 2, the recommendation agent 289 may generate a digital token using a random number generator specifically identifying the first client information handling system 250, or by distributing a token from a pool of digital tokens supplied to the enterprise management system 230 by the UEM platform 200. In such a way, digital tokens may not be duplicated across client information handling systems within the same enterprise management system.

At block 324, the client information handling system in an embodiment may routinely collect, classify, locate, index map, and transmit future JSON incidents to the hardware life extension learning recommendation and reward system for use in determining future recommendations for adjustments to software application usage for the client information handling system or other information handling systems. Such routine monitoring may allow the hardware life extension learning recommendation and reward system 280 to continuously provide recommendation for extension of hardware lifetimes for various components of a large pool of client information handling systems throughout the lifetime of the client devices. Further, as such recommendations are approved by users, the hardware life extension learning recommendation and reward system 280 may build a library of information used to make recommendations known to avoid negative impacts on user experience. The method may then end. According to embodiments above, client information handling systems in an embodiment may gather and transmit telemetries classified according to event types used in determinations of recommendations for extension of life for underperforming hardware components.

Figure 4:
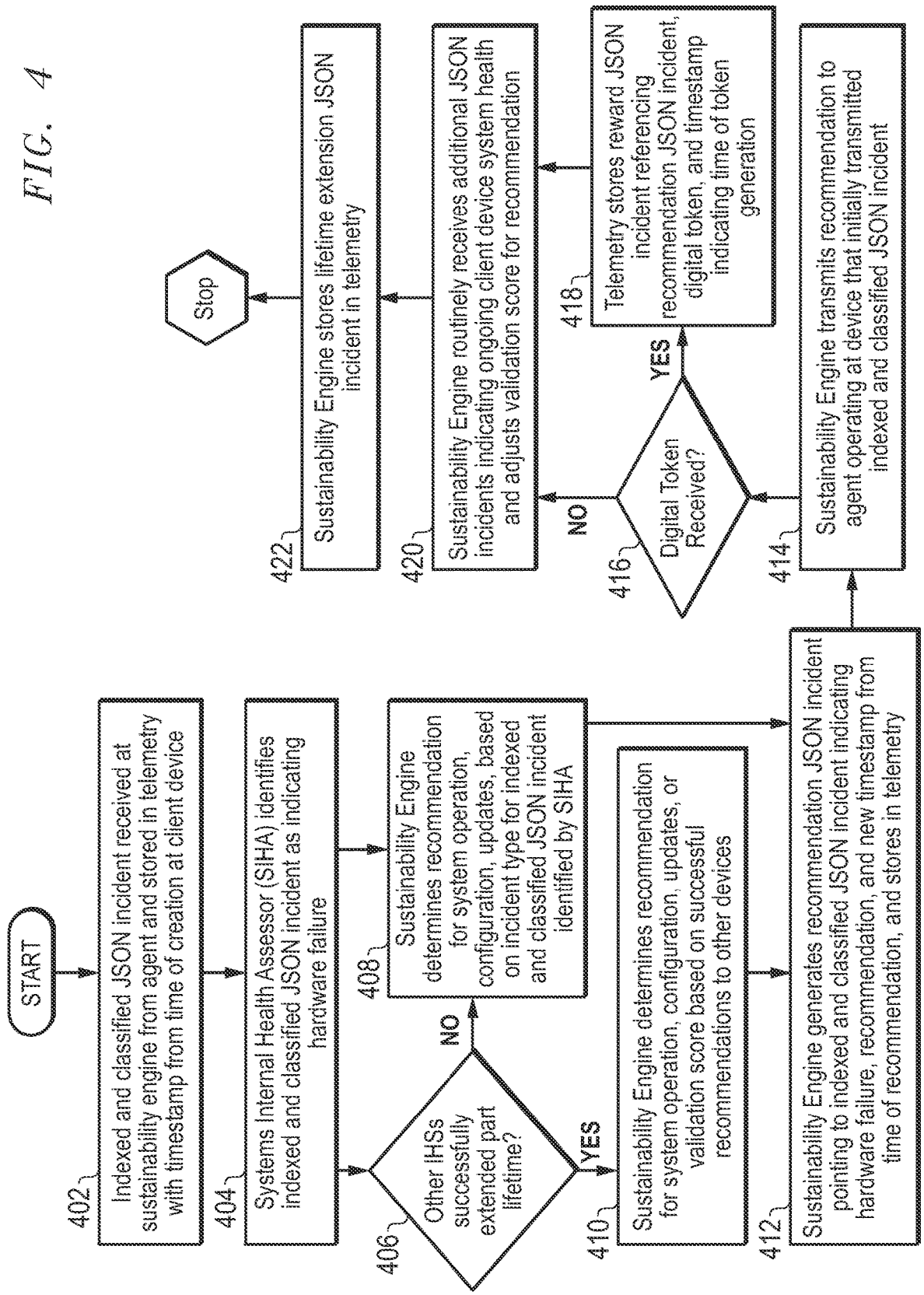
FIG. 4 is a flow diagram illustrating a method of determining recommendations to extend hardware life for a client information handling system according to an embodiment of the present disclosure.

FIG. 4 is a flow diagram illustrating a method of determining recommendations to extend hardware life based on telemetry data describing heat measurements, hardware component errors, and software application execution or usage of a client information handling system and user-approved, previous recommendations to other client information handling systems previously experiencing similar hardware errors, including performance inefficiencies, according to an embodiment of the present disclosure. As described herein, the hardware life extension learning recommendation and reward system in an embodiment may determine recommendations to adjust software application usage (e.g., by limiting access to resources of given hardware components) at client information handling systems in order to extend the lifetimes of commonly replaced hardware components. Further, the hardware life extension learning recommendation and reward system in various embodiments may only recommend adjustments that have been previously accepted and executed successfully by other users of other information handling systems experiencing similar hardware failures, indicating user satisfaction. In such a way, the hardware life extension learning recommendation and reward system may decrease the likelihood of future recommendations negatively impacting user experience at other client information handling systems. FIG. 4 may describe grouping of client information handling systems according to similarity of hardware failures and generation of recommendations based on user-approved adjustments to software usage at client information handling systems experiencing similar hardware failures, to extend lifetimes of the same or similar underperforming hardware components across multiple client information handling systems.

At block 402, a first JSON incident may be received at a sustainability engine from a client information handling device recommendation agent and stored in telemetry with a timestamp from the time of creation at the client information handling system in an embodiment. JSON is an example format of a markup language. It is contemplated that any format may be used in other embodiments, including XML and YAML. For example, as described above at blocks 308 and 310 of FIG. 3, and referencing an embodiment described above with respect to FIG. 2, the recommendation agent 289 operating at a first client information handling system 250 may transmit the following indexed and classified JSON incident to the sustainability engine 281 operating at the hardware lifetime extension learning recommendation and reward system 280:

```
{
  "data" :
  {
    "client_device_ID" : 123456,
    "client_device_model" : Laptop_5400,
    "event_id" : 456789,
    "source_ID" : power_analytics_module,
    "timestamp_unixtime_ms" : 1544145336,
    "location" : Austin_Texas,
    "custom_flags" :
      {
        "CPU_workload_code_compiling_software_app" : 0.90,
        "WHEA Error" : CPU,
        "Temp" : 150_F,
      }
    "device_current_state :
      {
        "NID_1_type" : WLAN,
        "NID_2_type" : WWAN,
        "NID_3_type" : BT,
        "memory_type" : 16_GB,
        "CPU_type" : X_Series,
        "GPU_type" : G_Series,
        "SSD_type" : 256_GB,
        "Display_type" : 15.6_HD_OLED,
        "OS Version" : 10.2
        "Video_Conference_App" : Active
        "Gaming_App" : Active
        "Code_Compiling_App" : Background
      }
  }
  "incident_class" : Workload
}
```

A systems internal health assessor (SIHA) of the sustainability engine platform in an embodiment may identify the indexed and classified JSON incident received at block 402 as indicating failure of a hardware component of a given hardware type, or substantial functional inefficiency of the same at block 404. For example, the SIHA 283 in an embodiment may search the indexed and classified JSON incident described above, which has been transmitted to the sustainability engine 281 and stored in telemetry 282 to identify the JSON event named "WHEA_Error," having a value CPU, indicating an error, such as a substantial inefficiency in the function at the CPU. Upon identification of such an error associated with an identified hardware component, the SIHA 283 may transmit a notification to the sustainability engine 281 that the indexed and classified JSON incident (e.g., identified by event id given within the indexed and classified JSON incident) indicates poor health of a hardware component. In other embodiments, the SIHA 283 may identify JSON events named "WHEA_Error," having values identifying any of the hardware components (e.g., 220, 241, 242, 243, 244, 245a, 245b, 246, 247, 248, or 249) included within the first client information handling system 250. The SIHA 283 in such embodiments may accordingly notify the sustainability engine 281 of the indexed and classified JSON incident including such errors and indicating poor health of the identified hardware component.

A sustainability engine of the sustainability engine platform in an embodiment may determine at block 406 whether other client information handling systems have successfully extended the lifetime of other hardware components of the same hardware type that previously failed based on recommendations generated by the hardware life extension learning recommendation and reward system. As described herein, the hardware life extension learning recommendation and reward system 280 operating at the UEM platform 200 in an embodiment may generate recommendations for software usage at a first client information handling system 250 for the purpose of extending a lifetime of one or more hardware components. These recommendations (e.g., for software usage at the first client information handling system 250) may be made based upon other recommendations previously accepted by a user of a second information handling system 270 to extend hardware lifetime at the second information handling system 270. In an embodiment in which other client information handling systems have not extended lifetimes of the same type of hardware component experiencing similar failures, the method may proceed to block 408 for determination of a recommended adjustment to the first client information handling system software application usage based on telemetry data received from the first client information handling system itself. In an embodiment in which other client information handling systems have extended lifetimes of the same type of hardware component experiencing similar failure, such as errors or inefficient operation detected, the method may proceed to block 410 for determination of a recommended adjustment to the first client information handling system software application usage based on previous recommendations to previously underperforming client information handling systems that successfully extended lifetime of hardware components experiencing similar failures.

At block 408, in an embodiment in which client information handling systems have not extended lifetimes of the same type of hardware component as the component identified as failing at block 404, the sustainability engine may determine a recommended adjustment to the first client information handling system operating environment based on telemetry data describing the first client information handling system itself, rather than any crowd-sourced telemetry data from other client information handling systems. For example, in an embodiment described with reference to FIG. 2, the sustainability engine 281 in an embodiment may recommend decreasing all workload on the hardware component associated with the error. More specifically, in an embodiment in which a WHEA error indicates failure of the CPU 242, the sustainability engine 281 may recommend throttling down all calls to the CPU 242 from all currently executing software applications. In another example, the sustainability engine 281 in such an embodiment may recommend terminating all background applications making calls on the processor 242. The method may then proceed to block 412 for generation of a recommendation JSON incident storing an indication of the recommended adjustment in response to the indexed and classified JSON incident received at block 402.

In an embodiment in which other client information handling systems have extended lifetimes of the same type of hardware component identified as failing or underperforming at block 404, the sustainability engine may determine a recommended adjustment to the first client information handling system software application usage based on previously executed adjustments at other client information handling systems experiencing similar hardware failures at block 410. For example, in an embodiment described with reference to FIG. 2, the user of the second client information handling system 270 in an embodiment may approve a recommendation to decrease usage of a specific software application (e.g., code compiling software application)

received from the hardware life extension learning recommendation and reward system 280, via recommendation agent 271, by limiting access to resources for a given hardware component made available to the specific software application, to extend the lifetime of the processor 272. In such an embodiment, the sustainability engine 281 in an embodiment may make such a recommendation based upon receiving an indexed and classified JSON incident from the second information handling system 270 that includes a WHEA error identifying the processor 272. When the user of the second information handling system 270 in such an embodiment approves the recommendation, the sustainability engine 281 may generate a recommendation JSON incident and a reward JSON incident similar to those described above in FIG. 2, with respect to recommendations made to the first information handling system 250. Importantly, each of the recommendation JSON incident and reward JSON incident generated for the recommendation made to the second information handling system 270 in such an embodiment may include the JSON event "incident class," having a value of "Workload," indicating a high workload on the failing hardware component is likely causing the identified errors.

Upon notification by the SIHA 283 in an embodiment that a particular indexed and classified JSON incident indicates poor hardware health, the sustainability engine 281 may search telemetry 282 for previously stored recommendation JSON incidents or reward JSON incidents that have the same incident classification as that given within the indexed and classified JSON incident identified by the SIHA 283. The sustainability engine 281 may then refer back to the previously stored indexed and classified JSON incident identified within the recommendation or reward JSON incident having the same incident classification to identify the hardware component generating errors within the previously stored indexed and classified JSON incident. If the previously stored indexed and classified JSON incident identified in the recommendation JSON (e.g., pertaining to an error at the second information handling system 270) and the indexed and classified JSON incident identified by the SIHA 283 (e.g., pertaining to an error at the first information handling system 250) share the same incident classification (e.g., "Workload") and the same WHEA error value (e.g., "CPU"), this may indicate the first information handling system 250 is likely experiencing the same type of error experienced at the second information handling system 270, and for the same reason (e.g., high workload on the CPU). In such a case, the sustainability engine 250 may determine the recommendation previously made to the second information handling system 270 should now be made to the first information handling system 250. More specifically, the sustainability engine 281 may reference a recommendation JSON incident associated with the second information handling system 270 to identify the JSON event "Recommendation," having a value "decrease_usage_code_compiling_app_0.01," and copy this JSON event into a new recommendation JSON incident associated with the first information handling system 250, as described directly below with respect to block 412.

The sustainability engine 281 in some embodiments may reference a recommendation validation score associated with this recommendation and describing the frequency with which such a rejection has been either accepted or rejected by users in the past, prior to transmitting such a recommendation to an information handling system currently experiencing failure of underperformance of that hardware component (e.g., 220, 241, 242, 243, 244, 245*a*, 245*b*, 246, 247, 248, or 249). For example, after determining at a sustainability engine 281 a recommended adjustment to software usage at a client information handling system (e.g., 250) reporting poor hardware health in the form of an indexed and classified JSON incident flagged by the SIHA, the sustainability engine 281 may ensure the validation score associated with that recommendation meets a preset validation score minimum threshold before transmitting the recommendation to any further client information handling systems.

At block 412, the sustainability engine in an embodiment may generate a recommendation JSON incident storing an indication of the recommended adjustment generated in response to the first JSON incident received at block 402. As described above, the recommendation may be determined based on telemetry data associated with the first client information handling system (e.g., as described with reference to block 408), or based on previously applied recommended adjustments at other client information handling systems (e.g., as described with reference to block 410). For example, in an embodiment in which the sustainability engine determines the recommendation based on the indexed and classified JSON incident associated with the first information handling system 250, identified by the SIHA 283 at block 404 (e.g., as described with reference to block 408), the sustainability engine may generate a recommendation JSON incident recommending terminating usage of background applications:

```
{
  "data" :
  {
    "event_id" : 789456,
    "timestamp_unixtime_ms" : 1655156447,
    "custom_flags" :
    {
      "incident_event_id" : 456789
      "Recommendation" : "terminate_background_app"
    }
  }
  "incident_class" : Workload
}
```

In another example embodiment in which the sustainability engine 281 determines the recommendation based on a previous recommendation associated with the second information handling system 270 (e.g., as described above with respect to block 410), the sustainability engine 281 may generate the following recommendation JSON incident that copies the recommendation to decrease usage of a code compiling application by ten percent (e.g., by decreasing calls made to the CPU by the code compiling application by ten percent) from the previous recommendation JSON incident associated with the second information handling system 270:

```
{
  "data" :
  {
    "event_id" : 789456,
    "timestamp_unixtime_ms" : 1655156447,
    "custom_flags" :
    {
      "incident_event_id" : 456789
      "Recommendation" :
        "decrease_usage_code_compiling_app_0.01"
    }
  }
}
```

```
    "incident_class" : Workload
}
```

Other embodiments may include various other recommendations for adjustments to software application usage based on the incident classification and hardware component associated with a WHEA error, notification, or warning. For example, an indexed and classified JSON incident including a WHEA error identifying a memory unit and associated with an incident classification "background_usage" may be associated with a recommendation JSON incident recommending termination of background applications or limiting of background applications' abilities to access memory. In another example, an indexed and classified JSON incident including a WHEA error identifying a power supply unit 245b (e.g., battery consumption power levels or other power system inefficiency) and a JSON event "CPU_workload_code_compiling_app," having a value of 0.90, may indicate a code compiling software application is using a percentage of CPU resources exceeding a preset application usage maximum threshold (e.g., 85%). Such an indexed and classified JSON incident in an embodiment may be associated with an incident classification "app_usage," and with a recommendation JSON incident recommending decreasing usage of the code compiling software application. In still another example, an indexed and classified JSON incident including a WHEA error identifying a power supply unit 245b and a JSON event "NID_workload_video_conf_app," having a value of 0.90, may indicate a video conferencing software application is using a percentage of network interface device resources exceeding a preset application usage maximum threshold (e.g., 85%). Such an indexed and classified JSON incident in an embodiment may be associated with an incident classification "app_usage," and with a recommendation JSON incident recommending decreasing usage of the video conferencing software application. In yet another example, an indexed and classified JSON incident including a WHEA error identifying a graphics processing unit (GPU) and a JSON event "GPU_workload_gaming_app," having a value of 0.90, may indicate a gaming software application is using a percentage of GPU resources exceeding a preset application usage maximum threshold (e.g., 85%). Such an indexed and classified JSON incident in an embodiment may be associated with an incident classification "app_usage," and with a recommendation JSON incident recommending decreasing usage of the gaming software application.

Storage of the recommendation, made in response to the indexed and classified JSON incident identified at block 404 involving the first information handling system may provide a history of recommendations generated pursuant to specific types of incidents received. As described below with respect to block 418, a reward JSON incident may be stored upon approval of the recommendation in block 412. Notably, such a reward JSON incident may only be recorded if the user accepts the recommendation. Storing the recommendation in a recommendation JSON event at block 412 in an embodiment may allow the sustainability engine to review recommendations that have been rejected by users, which may indicate concern that such recommendations may negatively impact user experience, thus reducing a validation score for the recommendation to be used as a valid recommendation. Validation score may be stored for the recommendation at the telemetry database 282 for particular recommendations and incident types.

The sustainability engine in an embodiment may transmit the recommendation JSON incident generated at block 414 to the agent operating at the first information handling system that transmitted the first JSON incident at block 402. For example, the sustainability engine 281 may transmit, via a network interface device, the following recommendation JSON incident generated at block 414 to the recommendation agent 289 for the first information handling system 250:

```
{
   "data" :
   {
      "event_id" : 789456,
      "timestamp_unixtime_ms" : 1655156447,
      "custom_flags" :
      {
         "incident_event_id" : 456789
         "Recommendation" :
         "decrease_usage_code_compiling_app_0.01"
      }
   }
   "incident_class" : Workload
```

At block 416, the sustainability engine in an embodiment may determine whether a digital token indicating user acceptance of the transmitted recommendation has been received. As described above with respect to FIG. 3 at block 322, the recommendation agent at the first client information handling system may generate a digital token indicating the recommended adjustment to the client information handling system software application usage received from the hardware life extension learning recommendation and reward system has been made upon acceptance by the user of a recommendation via a GUI 290 at the client information handling system 250. This may indicate the user does not anticipate this adjustment to degrade user experience in an embodiment. If a digital token has been received, this may indicate the recommended adjustment has not degraded user experience, thus adding to a validation score for the recommendation, and the method may proceed to block 418 for storage of a third JSON incident associating the recommended adjustment for the first client information handling system with the digital token indicating user acceptance of the recommendation, and time of application of the recommended adjustment. If a digital token has not been received, this may indicate the user anticipates the recommended adjustments will degrade the user experience, thus subtracting from a validation score for the recommendation, and the method may proceed to block 420 for routine tracking of additional JSON incidents indicating ongoing client device system health.

In an embodiment in which a digital token has been received, a reward JSON incident may be stored in telemetry at block 418 referencing or including the recommendation JSON incident, the digital token, and the timestamp indicating when the user approved the recommendation. Receipt of the digital token may indicate the recommended adjustment has not degraded user experience in an embodiment.

As described herein with respect to FIG. 2, in some embodiments, the sustainability engine 281 may adjust a recommendation validation score associated with the recommendation, based on receipt of a digital token indicating acceptance of the recommendation by a user, or a notification that the user has rejected the recommendation. Such a recommendation validation score in an embodiment may indicate a number of times (or percentage of times) that a user has either accepted or rejected a recommendation to limit resources of a given hardware component (e.g., 220, 241, 242, 243, 244, 245*a*, 245*b*, 246, 247, 248, or 249) made available to a specific software application (e.g., code compiling software application) in order to extend lifetime of the given hardware component. As described above, the sustainability engine 281 in some embodiments may reference this recommendation validation score prior to transmitting such a recommendation to an information handling system currently experiencing failure of underperformance of that hardware component (e.g., 220, 241, 242, 243, 244, 245*a*, 245*b*, 246, 247, 248, or 249). For example, after determining at a sustainability engine 281 a recommend adjustment to software usage at a client information handling system (e.g., 250) reporting poor hardware health in the form of an indexed and classified JSON incident flagged by the SIHA, the sustainability engine 281 may ensure the validation score associated with that recommendation meets a preset validation score minimum threshold before transmitting the recommendation to any further client information handling systems.

At block 420, in an embodiment in which a recommendation has been approved or rejected by a user of the first client information handling system, the sustainability engine may employ routine tracking of additional JSON incidents indicating ongoing client device system health for future predictions of recommendations for increasing hardware lifetime. For example, as described above with respect to block 324 in FIG. 3, such routine monitoring may allow the hardware life extension learning recommendation and reward system to continuously provide recommendation for extension of hardware lifetimes for various components of a large pool of client information handling systems throughout the lifetime of the client devices. Further, as such recommendations are approved by users with an increasing validation score, the hardware life extension learning recommendation and reward system may build a library of information used to make recommendations known to avoid negative impacts on user experience of recommendations with low validation scores.

The sustainability engine in an embodiment may store a lifetime extension JSON incident in telemetry identifying the duration by which the lifetime of the hardware component was extended by employing the previous recommendation at block 422. Eventually, the hardware component identified by the SIHA 283 at block 404 above may fail entirely or be removed or replaced by a user or IT professional reaching an end of life operation level or timeframe. In such an embodiment, the sustainability engine 281 may receive a new indexed and classified JSON incident timestamped at the time the hardware component failed entirely as a failure or end of life incident report. The SIHA 283 in such an embodiment may notify the sustainability engine 281 of this failure, which may then determine a duration by which the lifetime of the failed hardware component was extended by the adjustment recommended at block 414. For example, prior to the hardware life extension learning recommendation and reward system 280 transmitting the recommendation to the first client information handling system 250, the user of the second client information handling system 270 in an embodiment may approve a recommendation to decrease usage of a specific software application (e.g., code compiling software application) by limiting resources of a given hardware component (e.g., processor 272) made available to the specific software application. This user-approved decrease in usage of such an application in an embodiment may have successfully extended the lifetime of the processor 272 of the second information handling system 270 by a measurable period. In such an example embodiment, the sustainability engine 281 may determine the length of the hardware life extension for the processor 272 resulting from the previous recommendation through reference to further telemetry routinely gathered from the second client information handling system 270 until the processor 272 was ultimately replaced. For example, the sustainability engine 281 may determine the previous recommendation extended the lifetime of the processor 272 at the second information handling system 270 by ten days in one particular embodiment. In this way the actual end of life or a predicted end of life for a part may be extended to help delay replacement or disposal that incurs environmental impacts. In such an example embodiment, the sustainability engine 281 may store a lifetime extension JSON incident identifying the recommendation JSON incident that resulted in this lifetime extension and identifying the duration of the lifetime extension (e.g., ten days). The method may then end.

By measuring the duration of this lifetime extension in an embodiment, the hardware life extension learning recommendation and reward system in an embodiment may estimate a credit value for that extension of lifetime, as described in greater detail below with respect to FIG. 5. In such a way, the hardware life extension learning recommendation and reward system in an embodiment may provide recommendations for extension of life for underperforming hardware components based on user-approved recommendations to other client devices previously experiencing similar hardware failures.

Figure 5:
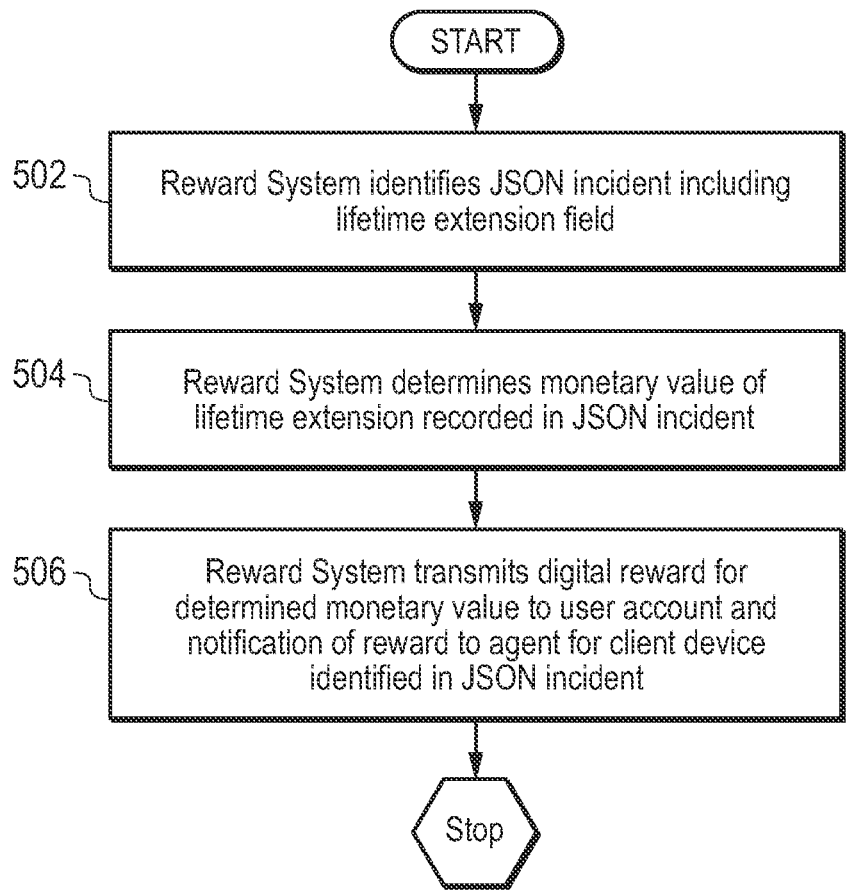
FIG. 5 is a flow diagram illustrating a method of rewarding users of client information handling systems for executing recommended adjustments according to an embodiment of the present disclosure.

FIG. 5 is a flow diagram illustrating a method of rewarding users of client information handling systems for executing recommended adjustments to software application usage to extend hardware lifetime according to an embodiment of the present disclosure. As described herein, the hardware life extension learning recommendation and reward system in an embodiment may reward users for accepting recommendations for extension of hardware component life. For example, the hardware life extension learning recommendation and reward system may measure the time by which an executed recommendation extended an underperforming hardware component and estimate a credit value for that lifetime extension. Upon a later user of a separate information handling system executing the same recommendation to extend the life of the same type of underperforming hardware component, the hardware life extension learning recommendation and reward system may apply a credit equivalent to the estimated credit value for the expected lifetime extension of the later underperforming hardware component to this later user.

At block 502, the reward system of the hardware life extension learning recommendation and reward system in an embodiment may identify a stored lifetime extension JSON incident including a lifetime extension field. For example, as described above at block 422 of FIG. 4, the sustainability engine 281 may determine a previous recommendation extended the lifetime of a processor 272 at the second information handling system 270 by ten days. In such an example embodiment, the sustainability engine 281 may store a lifetime extension JSON incident identifying the recommendation JSON incident that resulted in this lifetime extension and identifying the duration of the lifetime extension (e.g., ten days). Upon receipt of a digital token (e.g., as described above at block 418 of FIG. 4) indicating user acceptance of the same recommendation at the first information handling system 250, the sustainability engine 281 may reference this lifetime extension JSON incident to estimate how long the recommendation will extend the lifetime of processor 242 at the first information handling system 250.

At block 504, the reward system may determine a credit value of the lifetime extension recorded in the lifetime extension JSON incident. For example, in an embodiment in which the lifetime extension JSON incident identifies a lifetime extension of ten days, the sustainability engine 281 may further determine a credit value for such a lifetime extension by dividing the purchase price of processor 272 by the known average lifetime (in days) of other processors of the same type as processor 272, and multiplying that value by the determined lifetime extension (e.g., ten days) in an embodiment. More specifically, extending the lifetime of a processor 272 originally costing $500 with a predicted lifetime of two years by ten days may result in estimated credit value savings of $6.85 in a particular embodiment.

The reward system in an embodiment may transmit a digital reward equivalent to the determined credit value to a user account for the client device ID and a notification of such reward to an agent for the identified client device at block 508. For example, the sustainability engine 281 in an embodiment may apply a credit equivalent to the credit value stored within the reward JSON incident to an account associated with the user of the first client information handling system 250 or an operator within the enterprise management system 230, for example. More specifically, such a credit may be applied directly to a bank account in the form of digital transfer of currency, or may be applied to a user loyalty account in the form of a voucher or coupon for the future purchase of services or products. The method may then end. In such a way, the hardware life extension learning recommendation and reward system in an embodiment in an embodiment may reward users for execution of recommendations for extension of life for underperforming hardware components determined based on user-approved recommendations to other client devices previously experiencing similar hardware failures. Successful application of user-approved machine learning recommendations to extend hardware life may thus decrease GHG emissions associated with manufacture and transport of replacement parts and recycling, disposal, or refurbishment of underperforming hardware components.

The blocks of the flow diagrams of FIGS. 3, 4, and 5 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims.

In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A hardware life extension learning system code instructions executing on a management information handling system comprising:

a network interface device to receive a first operational telemetry for a first client information handling system and a second operational telemetry for a second client information handling system in a JavaScript Object Notation (JSON) format, wherein each of the first operational telemetry and the second operational telemetry includes a heat measurement exceeding a maximum temperature threshold value, an error associated with a labeled hardware type, and execution of a specifically identified software application;

a processor executing machine readable code instructions of the hardware life extension learning recommendation and reward system to:

determine, based on the first operational telemetry, that the error of a first hardware component of the labeled hardware type meets classification as a previously-occurring first JSON incident that has previously occurred at the first client information handling system and that the first hardware component exceeded the maximum temperature threshold value during execution of the specifically identified software application during the previous first JSON incident;

determine that execution of limiting machine readable code instructions at the first client information handling system to limit use of the first hardware component of the labeled hardware type during execution of the specifically identified software application extended a lifetime of the first hardware component by a lifetime extension period at the first client information handling system in the previous first JSON incident;

determine that the error associated with the labeled hardware type is occurring at a second hardware component of the labeled hardware type at the second client information handling system from the second operational telemetry included in a second JSON incident indexes and matches with a classification of the previous first JSON incident at the management information handling system; and the network interface device to transmit instructions to the second information handling system for execution of the limiting machine readable code instructions to limit use of the second hardware component of the labeled hardware type during execution of the specifically identified software application to extend the lifetime of the second hardware component operating at the second client information handling system.

2. The information handling system of claim 1, wherein the labeled hardware type is a type of hardware processing unit.

3. The information handling system of claim 1, wherein the labeled hardware type is a type of network interface device.

4. The information handling system of claim 1, wherein the labeled hardware type is a type of power supply unit.

5. The information handling system of claim 1 further comprising:
the network interface device to:
receive an indication that a user of the second client information handling system has rejected the instructions to execute the limiting machine readable code instructions to limit use of the second hardware component during execution of the specifically identified software application.

6. The information handling system of claim 1 further comprising:
the network interface device to:
receive an indication that the second client information handling system executed the limiting machine readable code instructions to limit use of the second hardware component due to execution of the specifically identified software application.

7. The information handling system of claim 1 further comprising:
the network interface device to:
receive an indication that the second client information handling system executed the limiting machine readable code instructions to limit use of the second hardware component during execution of the specifically identified software application; and
the processor to execute code instructions to determine a credit value associated with the lifetime extension period associated with the first information handling system and credit an account of a second user of the second information handling system by the determined credit value.

8. A method of instructing adjustments to software usage to extend hardware life for client information handling systems comprising:
receiving, via a network interface device at a management information handling system, a first operational telemetry for a first client information handling system and a second operational telemetry for a second client information handling system in a JavaScript Object Notation (JSON) format, wherein each operational telemetry from the first client information handling system and the second client information handling system includes a heat measurement exceeding a maximum temperature threshold value, an error associated with hardware components having a labeled hardware type, and data indicating execution of a specifically identified software application;
determining, via a processor executing machine readable code instructions of a hardware life extension learning system at the management information handling system, that a first error of a first hardware component of the labeled hardware type in the first operational telemetry meets classification as a previously-occurring first JSON incident, and that execution of limiting machine readable code instructions at the first client information handling system to limit use of a first hardware component during execution of the identified software application extended a lifetime of the first hardware component and kept the first hardware component below a maximum temperature threshold value associated with the first error in the first operational telemetry meeting that previous first JSON incident by a lifetime extension period at the first client information handling system;
determining that a second error of a second hardware component of the labeled hardware type has occurred at the second client information handling system during execution of the identified software application at the second client information handling system is classified as a second JSON incident from the second client information handling system and that the second JSON incident indexes and matches the previous first JSON incident from the first client information handling system; and
instructing the second information handling system, via an instruction transmitted by the network interface device, to execute code limiting machine readable instructions to limit use of the second hardware component during execution of the identified software application to extend the lifetime of the second hardware component operating at the second client information handling system.

9. The method of claim 8 further comprising:
receiving an indication that the second client information handling system has executed the limiting machine readable code instructions to limit use of the second hardware component during execution of the identified software application; and
determining a credit value associated with the lifetime extension period.

10. The method of claim 8 further comprising:
transmitting an indication of a reward equivalent to a credit value associated with the lifetime extension period to an account associated with a user of the second client information handling system when an indication is received that the second client information handling system has executed the limiting machine readable code instructions to limit use of the second hardware component.

11. The method of claim 8 further comprising:
receiving an indication that the second client information handling system has not executed the limiting machine readable code instructions to limit use of the first hardware component during execution of the specifically identified software application.

12. The method of claim 8 further comprising:
receiving an indication that the second client information handling system has executed the limiting machine readable code instructions to limit use of the second hardware component during execution of the identified software application; and
increasing a recommendation validation score associated with the limiting machine readable code instructions, the error associated with the labeled hardware type, and execution of the specifically identified software application for the hardware life extension learning system.

13. The method of claim 8, wherein the labeled hardware type is a graphics processing unit and the specifically identified software application is a gaming application.

14. The method of claim 8, wherein the labeled hardware type is a type of hardware processor and the specifically identified software application is a software code compiling application.

15. A hardware life extension learning system executing as code instructions on a management information handling system comprising:

a network interface device configured to: receive a plurality of operational telemetries for a plurality of client information handling systems in a JavaScript Object Notation (JSON) format, including a previously underperforming client device and a currently underperforming client device, wherein each operational telemetry includes a heat measurement exceeding a maximum temperature threshold value, an error associated with a labeled hardware type, and data indicating execution of a specifically identified software application;

the processor executing code instructions of the hardware life extension learning system to determine that the previously underperforming client device reporting in JSON format the beat measurement exceeding the maximum temperature threshold value, the error for a first hardware component associated with the labeled hardware type, and the data indicating execution of a specifically identified software application are classified as a previous first JSON incident, and the currently underperforming client device reporting the heat measurement exceeding the maximum temperature threshold value, the error for a second hardware component associated with the labeled hardware type, and the data indicating execution of a specifically identified software application are classified as a second JSON incident such that the index of the second JSON incident matches the previous first JSON incident;

the processor executing code instructions of the hardware life extension learning system to determine that executing limiting machine readable code instructions to limit use of the first hardware component of the labeled hardware type at the previously underperforming client device by the specifically identified software application reduced the heat measurement below the maximum temperature threshold value during execution of the specifically identified software application and extended a lifetime of the first hardware component of the labeled hardware type by a lifetime extension period at the previously underperforming client device;

the network interface device configured to:
  transmit instructions to the currently underperforming client device to execute limiting machine readable code instructions to limit use of a second hardware component during execution of the specifically identified software application to extend a lifetime of the second hardware component of the labeled hardware type at the currently underperforming client device; and receive an indication that the currently underperforming client device has executed the limiting machine readable code instructions to limit use of the second hardware component by the specifically identified software application; and the processor executing code instructions to determine and transmit a credit value for the user of the currently underperforming client device based on the lifetime extension period determined from executing the limiting machine readable code instructions at the previously underperforming client device.

16. The information handling system of claim 15 further comprising:
  the processor executing code instructions to:
    transmit a credit to an account of the user of the currently underperforming client device by the determined credit value.

17. The information handling system of claim 15 further comprising:
  increasing a recommendation validation score associated with the limiting machine readable code instructions to limit use of hardware components of the labeled hardware type during execution of the specifically identified software application for the error associated with the labeled hardware type at the hardware life extension learning system.

18. The information handling system of claim 15, wherein the network interface device is configured to transmit instructions to the currently underperforming client device including an instruction execute the limiting machine readable code instructions to limit use of a power supply unit as the second hardware component during execution by a processor executing code instructions of the specifically identified software application.

19. The information handling system of claim 15, wherein the network interface device is configured to transmit instructions to the currently underperforming client device that includes an instruction to execute the limiting machine readable code instructions limit use of a power supply unit as the second hardware component by a network interface device transceiving data pursuant to and during execution of the specifically identified software application.

20. The information handling system of claim 15, wherein the labeled hardware type is a type of network interface device and the specifically identified software application is a video conferencing application.

* * * * *